United States Patent
Kamiura

(10) Patent No.: US 10,459,654 B2
(45) Date of Patent: Oct. 29, 2019

(54) STORAGE APPARATUS, STORAGE APPARATUS BACKUP METHOD, STORAGE APPARATUS BACKUP SYSTEM, AND STORAGE MEDIUM

(71) Applicant: NEC Corporation, Minato-ku, Tokyo (JP)

(72) Inventor: Tomoka Kamiura, Tokyo (JP)

(73) Assignee: NEC CORPORATION, Tokyo (JP)

(*) Notice: Subject to any disclaimer, the term of this patent is extended or adjusted under 35 U.S.C. 154(b) by 140 days.

(21) Appl. No.: 15/840,144

(22) Filed: Dec. 13, 2017

(65) Prior Publication Data

US 2018/0181308 A1 Jun. 28, 2018

(30) Foreign Application Priority Data

Dec. 22, 2016 (JP) ................... 2016-249575

(51) Int. Cl.
*G06F 3/06* (2006.01)

(52) U.S. Cl.
CPC ............ *G06F 3/065* (2013.01); *G06F 3/0619* (2013.01); *G06F 3/0644* (2013.01); *G06F 3/0664* (2013.01); *G06F 3/0683* (2013.01); *G06F 2201/84* (2013.01)

(58) Field of Classification Search
CPC .. G06F 2201/84; G06F 3/065; G06F 11/2082; G06F 3/0647; G06F 11/2058; G06F 11/1451; G06F 2201/855; G06F 3/0641; G06F 16/10; G06F 3/0646
See application file for complete search history.

(56) References Cited

U.S. PATENT DOCUMENTS

2013/0054523 A1   2/2013   Anglin et al.
2015/0324418 A1*  11/2015  Tatsumi ............... G06F 3/0608
                                                       707/690

FOREIGN PATENT DOCUMENTS

| JP | 2011-248742 A | 12/2011 |
| JP | 2015-015047 A | 1/2015 |
| JP | 2015-045993 A | 3/2015 |
| WO | 2016/185573 A1 | 11/2016 |

OTHER PUBLICATIONS

Japanese Office Action for JP Application No. 2016-249575 dated Feb. 5, 2019 with English Translation.

* cited by examiner

*Primary Examiner* — Reginald G Bragdon
*Assistant Examiner* — Thanh D Vo

(57) ABSTRACT

A storage apparatus includes a backup controller and a remote copy controller. The backup controller identifies a common data area being an area storing data common to a first volume and a second volume, each of the volumes including a storage area capable of storing data. The backup controller transmits an instruction to a backup destination storage apparatus including a backup volume, the instruction causing to copy, in the backup destination storage apparatus, data stored in the common data area, from a backup volume of the second volume to a backup volume of the first volume. The remote copy controller transmits at least part of data stored in an area different from the common data area in the first volume to the backup destination storage apparatus.

8 Claims, 28 Drawing Sheets

Fig. 5

VOLUME MANAGEMENT TABLE

| ENTITY VOLUME NUMBER (IDENTIFICATION INFORMATION) 501 | CLONE VOLUME NUMBER (IDENTIFICATION INFORMATION) 502 | BACKUP VOLUME NUMBER (IDENTIFICATION INFORMATION) 503 | BACKUP STATE 504 | BACKUP START ORDER 505 |
|---|---|---|---|---|
| EV0 | CV0 | RV00 | DONE | 1 |
| EV0 | CV1 | – | – | – |
| EV0 | CV2 | RV20 | IN PROGRESS | 2 |
| ... | ... | ... | ... | ... |
| EV0 | CVn | RVm | UNPROCESSED | – |

DIFFERENCE TABLE

| PAGE NUMBER | CLONE VOLUME NUMBER (IDENTIFICATION INFORMATION) | | | | |
|---|---|---|---|---|---|
| | CV0 | CV1 | CV2 | ... | CVn |
| page0 | 0 | 0 | 0 | ... | 0 |
| page1 | 1 | 1 | 0 | ... | 0 |
| page2 | 1 | 1 | 1 | ... | 0 |
| page3 | 0 | 0 | 0 | ... | 0 |
| ... | ... | ... | ... | ... | ... |
| page_m | 0 | 0 | 0 | ... | 0 |

Fig. 7

COPY ADDRESS TABLE 105c

| PAGE NUMBER | CLONE VOLUME NUMBER (IDENTIFICATION INFORMATION) | | | | |
|---|---|---|---|---|---|
| | CV0 | CV1 | CV2 | ... | CVn |
| page0 | 0 | 0 | 0 | ... | 0 |
| page1 | 0 | 0 | 1 | ... | 0 |
| page2 | 0 | 0 | 1 | ... | 0 |
| page3 | 0 | 0 | 0 | ... | 0 |
| ... | ... | ... | ... | ... | ... |
| page_m | 0 | 0 | 0 | ... | 0 |

701, 702

US 10,459,654 B2

STORAGE APPARATUS, STORAGE APPARATUS BACKUP METHOD, STORAGE APPARATUS BACKUP SYSTEM, AND STORAGE MEDIUM

This application is based upon and claims the benefit of priority from Japanese Patent Application No. 2016-249575, filed on Dec. 22, 2016, the disclosure of which is incorporated herein in its entirety by reference.

TECHNICAL FIELD

The present disclosure relates to a technology regarding making a backup of data stored in a storage.

BACKGROUND ART

A product using a linked clone method (for example, a Linked Clone Technology® by VMware®) is used as a generation method of a virtual machine. For example, PTL 1 (Japanese Unexamined Patent Application Publication No. 2011-248742) describes a technology related to a storage management system using the linked clone method. PTL 1 describes a technology of a storage system for reducing disk capacity by managing a disk image of each virtual machine as a difference from a master image.

When backing up a virtual machine, data access for duplicating a volume on the virtual machine (referred to as a "virtual volume") occurs. In some cases, data transfer for transferring the volume to a backup destination may be performed.

PTL 2 (Japanese Unexamined Patent Application Publication No. 2015-15047) describes a technology for making a duplicate of backup source data at a backup destination while eliminating overlap. A system described in PTL 2 is configured to check whether or not particular data are already transferred to a backup destination by comparing data already transmitted to the backup destination with data to be transferred from a backup source.

SUMMARY

An exemplary object of the present disclosure is to provide a backup apparatus and the like that is configured to reduce an amount of data transmitted between a storage apparatus as a backup source and a storage apparatus as a backup destination.

A storage apparatus according to one aspect of the present disclosure includes: a backup controller that is configured to identify a common data area in each of a first volume and a second volume, each of the volumes including a storage area capable of storing data, the common data area being an area storing data common to the first volume and the second volume, and to transmit an instruction to a backup destination storage apparatus being another storage apparatus configured to include, for each of the first volume and the second volume, a backup volume storing backup data duplicated from each of the first volume and the second volume, the instruction causing the back destination storage apparatus to copy, in the backup destination storage apparatus, data stored in the common data area, from the backup volume of the second volume to the backup volume of the first volume; and a remote copy controller that is configured to transmit data stored in an area different from the common data area in the first volume to the backup destination storage apparatus to duplicate the data to the backup volume of the first volume in the backup destination storage apparatus.

A storage apparatus backup method according to another aspect of the present disclosure includes, by a storage apparatus including a volume including a storage area capable of storing data, identifying a common data area in each of a first volume and a second volume, each of the volumes including a storage area capable of storing data, the common data area being an area storing data common to the first volume and the second volume, transmitting an instruction to a backup destination storage apparatus being another storage apparatus configured to include a backup volume storing backup data duplicated from the volume, the instruction including information by which the common data area can be identified and causing the backup destination storage apparatus to copy, in the backup destination storage apparatus, data stored in the common data area, from the backup volume of the second volume to the backup volume of the first volume, and by transmitting data stored in an area different from the common data area in the first volume to the backup destination storage apparatus, duplicating the data to the backup volume of the first volume in the backup destination storage apparatus.

A storage apparatus backup apparatus according to yet another aspect of the present disclosure includes, one or more backup volumes being a volume including a storage area capable of storing data; processing circuitry and a memory storing instructions that when executed by the processing circuitry allows: a remote instruction processing unit to execute processing of receiving an instruction for backup of a first volume, from a backup source storage apparatus being another storage apparatus, the instruction at least including information by which a common data area can be identified, the common data area being an area storing data common to the first volume and a second volume, each of the volumes being included in the backup source storage apparatus and including a storage area capable of storing data, in response to the instruction, copying data included in the common data area identified by the instruction, from the backup volume of the second volume in the storage apparatus itself to the backup volume of the first volume, receiving at least part of data included in an area different from the common data area in the first volume from the backup source storage apparatus, and writing the received data onto the backup volume of the first volume.

A storage apparatus backup method according to yet another aspect of the present disclosure includes, by a storage apparatus including a volume including a storage area capable of storing data, receiving an instruction related to backup of a first volume, from a backup source storage apparatus being another storage apparatus, the instruction at least including information by which a common data area can be identified, the common data area being an area storing data common to the first volume and a second volume, each of the volumes being included in the backup source storage apparatus and including a storage area capable of storing data; in response to the received instruction, copying data included in the common data area identified by the instruction, from the volume storing data duplicated from the second volume to the volume storing data duplicated from the first volume; receiving at least part of data included in an area different from the common data area in the first volume, from the backup source storage apparatus; and writing the received data onto the volume storing data duplicated from the first volume.

A storage apparatus backup system according to yet another aspect of the present disclosure includes a backup source storage apparatus being a storage apparatus including a first volume and a second volume, each of the volumes being a volume including a storage area capable of storing data, and a backup destination storage apparatus being another storage apparatus including a backup volume being a volume including a storage area capable of storing data.

The backup source storage apparatus in the backup system further includes a backup controller that identifies a common data area being an area storing data common to the first volume and the second volume, and transmits an instruction to the backup destination storage apparatus, the instruction causing the backup destination storage apparatus to copy, in the backup destination storage apparatus, data stored in the common data area, from the backup volume of the second volume to the backup volume of the first volume, and a remote copy controller that transmits at least part of data stored in an area different from the common data area in the first volume to the backup destination storage apparatus.

The backup destination storage apparatus in the backup system further includes a remote instruction processing unit that performs processing of receiving the instruction from the backup source storage apparatus and, in response to the received instruction, and copying data included in the common data area identified by the instruction, from the backup volume of the second volume to the backup volume of the first volume, in the backup destination storage apparatus, and processing of receiving at least part of data included in an area different from the common data area in the first volume, from the backup source storage apparatus, and writing the received data onto the backup volume of the first volume.

Further, the object of the present disclosure is also achieved by a computer program providing the storage apparatus including the configuration, the storage apparatus backup method, the storage apparatus backup system, and the like by a computer, a computer-readable storage medium storing the computer program, and the like.

BRIEF DESCRIPTION OF THE DRAWINGS

FIG. 5 is a diagram illustrating a specific example of a table (part 1) including information about a volume included in the storage apparatus according to the first example embodiment.

FIG. 6 is a diagram illustrating a specific example of a table (part 2) including information about a volume included in the storage apparatus according to the first example embodiment.

FIG. 7 is a diagram illustrating a specific example of a table (part 3) including information about a volume included in the storage apparatus according to the first example embodiment.

EXAMPLE EMBODIMENT

In the following, a technical consideration related to the present disclosure will be described more in detail. For convenience of description, backup of a virtual machine generated by using a linked clone method will be used as a specific example below. The technology according to the present disclosure is not limited to such a specific example and is applicable to another type of backup processing (for example, virtual machine backup by a method other than the linked clone method).

The linked clone method provides a master image (master volume) that is a machine image common to one or more virtual machines. The linked clone method manages difference data from the master image in a virtual volume (clone volume) in each virtual machine. The linked clone method is able to reduce disk capacity used for storing a clone volume on each virtual machine. The master volume may be hereinafter referred to as an entity volume. A clone volume including difference data with respect to a certain entity volume may be referred to as a clone volume derived (generated) from the entity volume.

Figure 1:
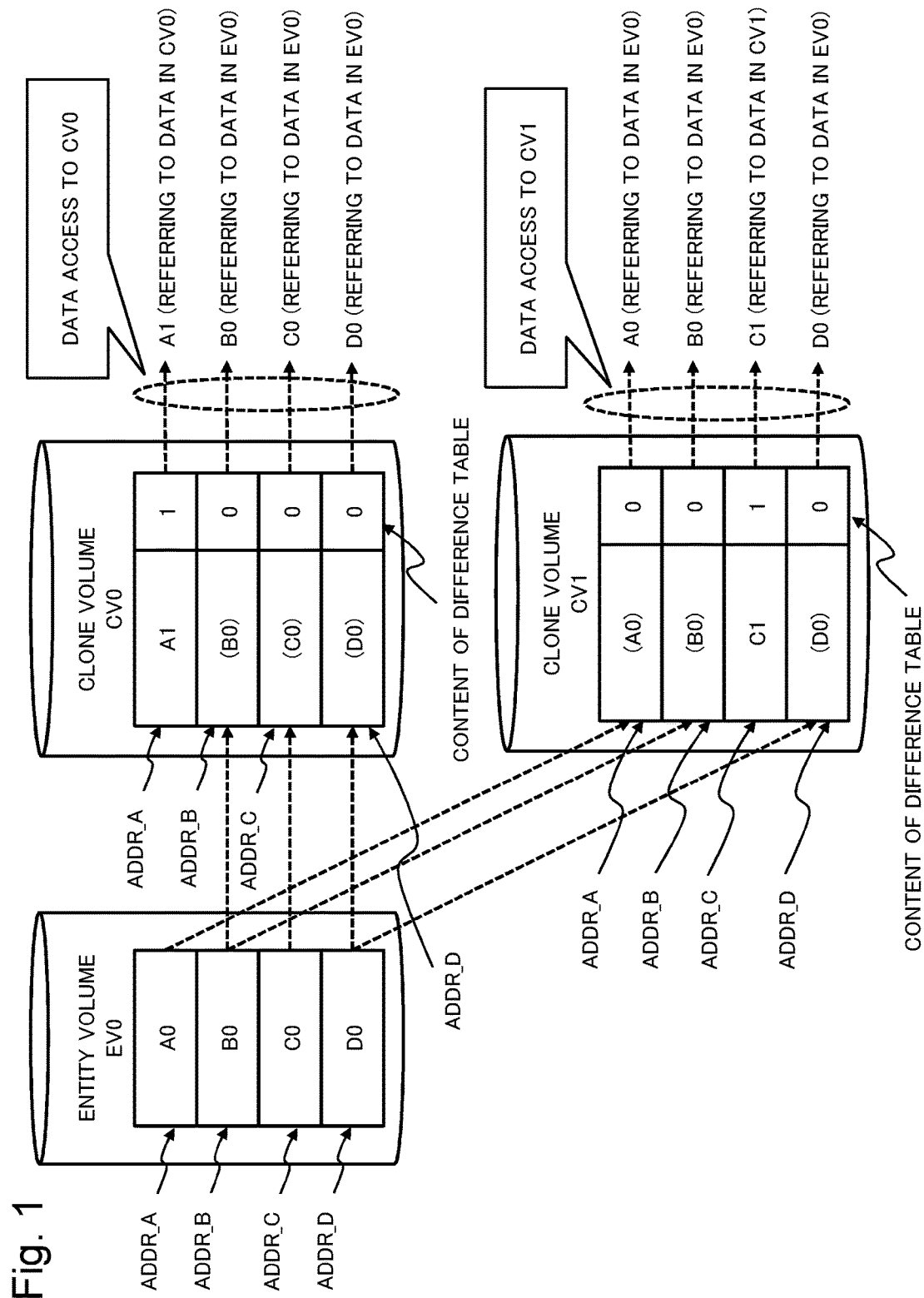
FIG. 1 is a diagram illustrating a specific example of data access in a linked clone method.

FIG. 1 illustrates a specific example of data access in the linked clone method. In FIG. 1, an entity volume (EV0) represents a master volume referred to by one or more virtual machines. Each of clone volumes (CV0 and CV1) is a virtual volume on a virtual machine generated by the linked clone method.

Assuming a case where data access to a particular area (for example, an area identified by a certain address) in a clone volume occurs. When the clone volume does not store difference data with respect to the entity volume for the area, data in the entity volume are referred to by the data access to the area. In the specific example exemplified in FIG. 1, for example, when data access to areas (for example, ADDR_B, ADDR_C, and ADDR_D) in CV0 (clone volume) occurs, data in corresponding areas (for example, ADDR_B, ADDR_C, and ADDR_D) in EV0 are referred to. Similarly, when data access to areas ADDR_A, ADDR_B, and ADDR_D in CV1 (clone volume) occurs, data in corresponding areas (ADDR_A, ADDR_B, and ADDR_D) in EV0 are referred to.

On the other hand, when a clone volume stores difference data with respect to the entity volume for a certain area, data stored in the clone volume are referred to by data access to the area. In the specific example exemplified in FIG. 1, for example, when data access to an area ADDR_A in CV0 (clone volume) occurs, data (A1) stored in the clone volume are referred to. Similarly, for example, when data access to an area ADDR_C in CV1 (clone volume) occurs, data (C1) stored in the clone volume are referred to.

For example, data access management as described above may be provided by using difference management information (for example, a difference table in FIG. 1) managing whether there are difference data between a clone volume and the entity volume. For example, such difference management information may be expressed by using a bitmap ("1" is set to an area including a difference, and "0" is set to an area not including a difference being set to "0") as illustrated in FIG. 1.

Assuming a case to back up a clone volume on a virtual machine generated by the linked clone method. For example, the clone volume may be provided for each system user (or each virtual machine). Accordingly, in some cases, a large number of clone volumes may be backed up.

As a method of generating a backup of a clone volume (may be hereinafter referred to as a "backup volume") at a backup destination, for example, a method of transferring the entire clone volume (entire data) to the backup destination may be used. However, when this method is used, reference to an entity volume may occur when each clone volume is backed up. Consequently, a processing load of access in the entity volume may increase. Further, when a backup source and a backup destination are connected by using a communication line, traffic increases by transfer of clone volume data. Accordingly, when such a method is employed, a backup is need to be scheduled in consideration of increase in a processing load and traffic, and the like.

By contrast, when backing up a clone volume generated by the linked clone method to a backup destination (remote site), the technology according to the present disclosure enables to reduce traffic required for backup processing, by focusing on a difference between clone volumes. Further, the technology according to the present disclosure enables to suppress increase of a processing load of access to an entity volume, when backing up a clone volume.

The backup technology according to the present disclosure to be described by using each of the following example embodiments provides, for example, a configuration capable of performing processing as described below. Specifically, the backup technology according to the present disclosure may include identifying an area storing same data and an area storing different data between one or more clone volumes each of which refers to a common entity volume (i.e. being derived from the common entity volume). When backing up a clone volume (referred to as a "first clone volume"), the backup technology according to the present disclosure may include checking whether another clone volume (referred to as a "second clone volume") derived from the same entity volume as the clone volume (first clone volume) is already backed up to a remote site. The backup technology according to the present disclosure may include transferring an area storing different data between the first clone volume and the second clone volume, from a backup source to the remote site. In other words, the backup technology according to the present disclosure is able to identify an area storing same data between the first clone volume and the second clone volume, and transmit an area storing different data to the remote site, without making an inquiry to the remote site. Consequently, for example, a backup volume duplicating at least part of the first clone volume is generated at the remote site.

When the second clone volume is backed up at the remote site, the backup technology according to the present disclosure is able to duplicate, at the remote site, an area storing same data in the first and second clone volumes from a backup volume of the second clone volume to a backup volume of the first clone volume. Thus, a backup volume including entire data in the first clone volume is generated at the remote site.

The backup technology according to the present disclosure, being configured as described above, is able to reduce clone volume data transferred from the backup source to the remote site. The reason is that there is no need to transfer data common to the first clone volume and the second clone volume from the backup source to the remote site. Further, access to the entity volume upon backup of the first clone volume is reduced. The reason is that there is no need to acquire data common to the first clone volume and the second clone volume from the entity volume. Further, there is no need to make an inquiry to the remote site about whether or not certain data are backed up at the remote site.

Using the respective example embodiments, a storage apparatus, a storage apparatus backup method, a storage apparatus backup system, and the like that are capable of providing the backup technology according to the present disclosure will be described in detail below. Configurations of the apparatus, the system, and the like that are described in the respective example embodiments below are exemplifications, and the technical scope of the present disclosure is not limited thereto. Arrangement of components (for example, partition by functional units) constituting the apparatus and the system, according to the respective example embodiments below, is an example capable of providing the technology according to the present disclosure. When providing the technology according to the present disclosure, various configurations may be assumed without being limited to the following exemplifications. In other words, each component exemplified in the respective example embodiments below may be further partitioned. Further, one or more components in the respective example embodiments below may be integrated.

The technology according to the present disclosure may be configured by using a single apparatus (a physical or virtual apparatus) or may be provided by using a plurality of separate apparatuses (physical or virtual apparatuses). When the technology according to the present disclosure is provided (implemented) by a plurality of apparatuses, the respective apparatuses may be communicably connected to one another by a wired or wireless communication network (communication line), or a suitable combination thereof. Such a communication network may be a physical communication network or a virtual communication network. A hardware configuration capable of providing the respective example embodiments described below will be described later.

First Example Embodiment

Referring to drawings, a first example embodiment of the technology according to the present disclosure will be described below.

(Configuration)

Figure 2:
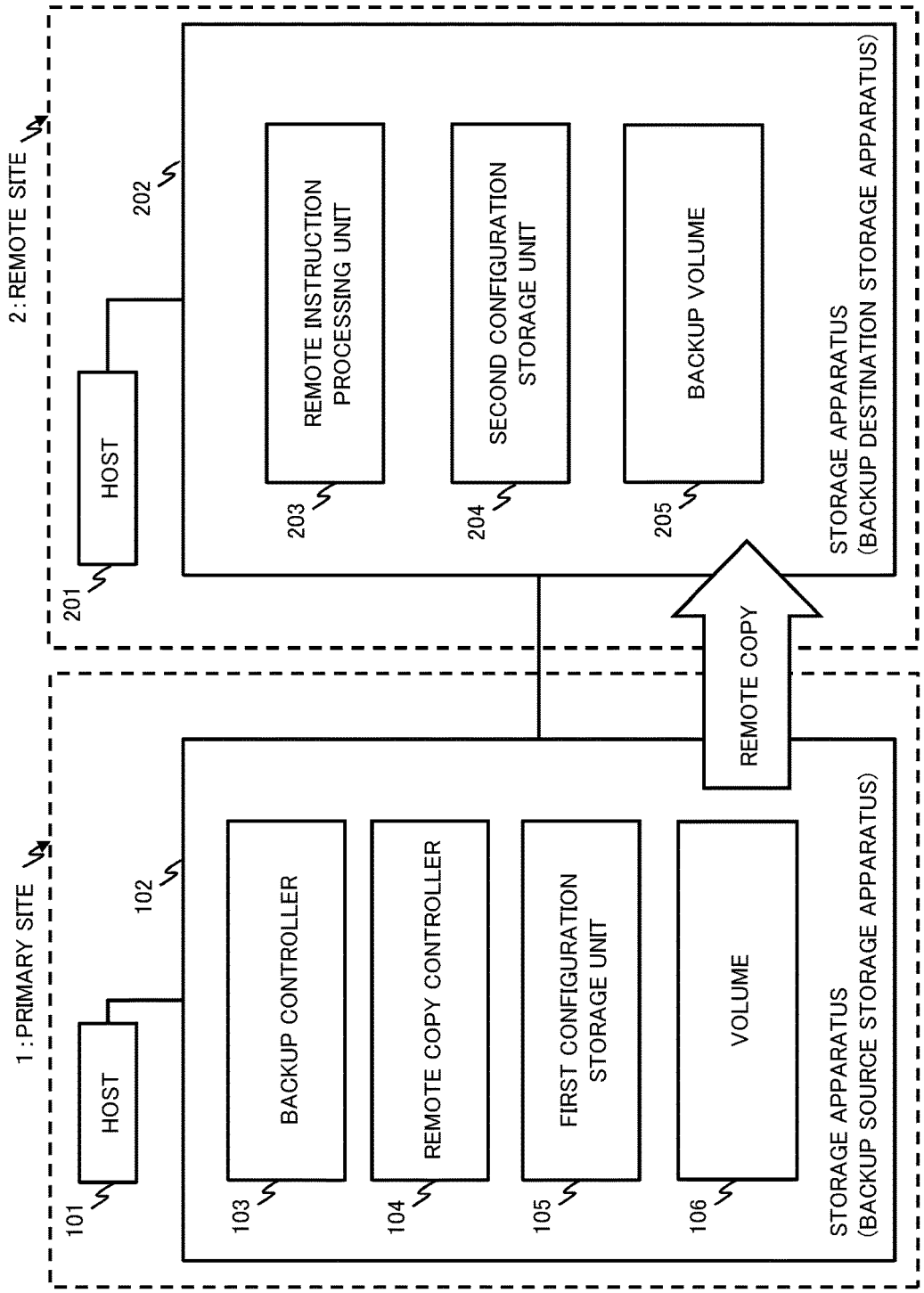
FIG. 2 is a block diagram exemplifying functional configurations of storage apparatuses according to a first example embodiment.

FIG. 2 is a block diagram exemplifying a functional configuration of a storage apparatus and a backup system, according to the present example embodiment.

In FIG. 2, a storage apparatus 102 is placed at a primary site 1, and a storage apparatus 202 is placed at a remote site 2. The storage apparatus 102 is, for example, a backup source storage apparatus, and the storage apparatus 202 is, for example, a backup destination storage apparatus.

The primary site 1 and the remote site 2 are communicably connected through a suitable communication line. For example, the primary site 1 and the remote site 2 may be included in a single system configured by using one or more physical or virtual information processing apparatuses and the like. Further, for example, the primary site 1 and the remote site 2 may be provided by a plurality of physically separated systems.

The communication line connecting the primary site 1 and the remote site 2 may be a narrowband communication network such as a local area network (LAN), or may be a broadband communication network such as the Internet. Further, when the primary site 1 and the remote site 2 are included in a single system, the sites may be connected by a suitable communication bus. The communication line connecting the primary site 1 and the remote site 2 may be provided in a wired or wireless manner, or in a combination thereof. Further, when the primary site 1 and the remote site 2 are constructed in a virtual environment, a communication line connecting the sites may be virtualized.

Referring to FIG. 2, the storage apparatus 102 is communicably connected to a host 101, and the storage apparatus 202 is communicably connected to a host 201.

For example, the host 101 may be an information processing apparatus configured with a computer and the like. The storage apparatus 102 may function as an apparatus providing a storage area for the host 101.

Figure 3:
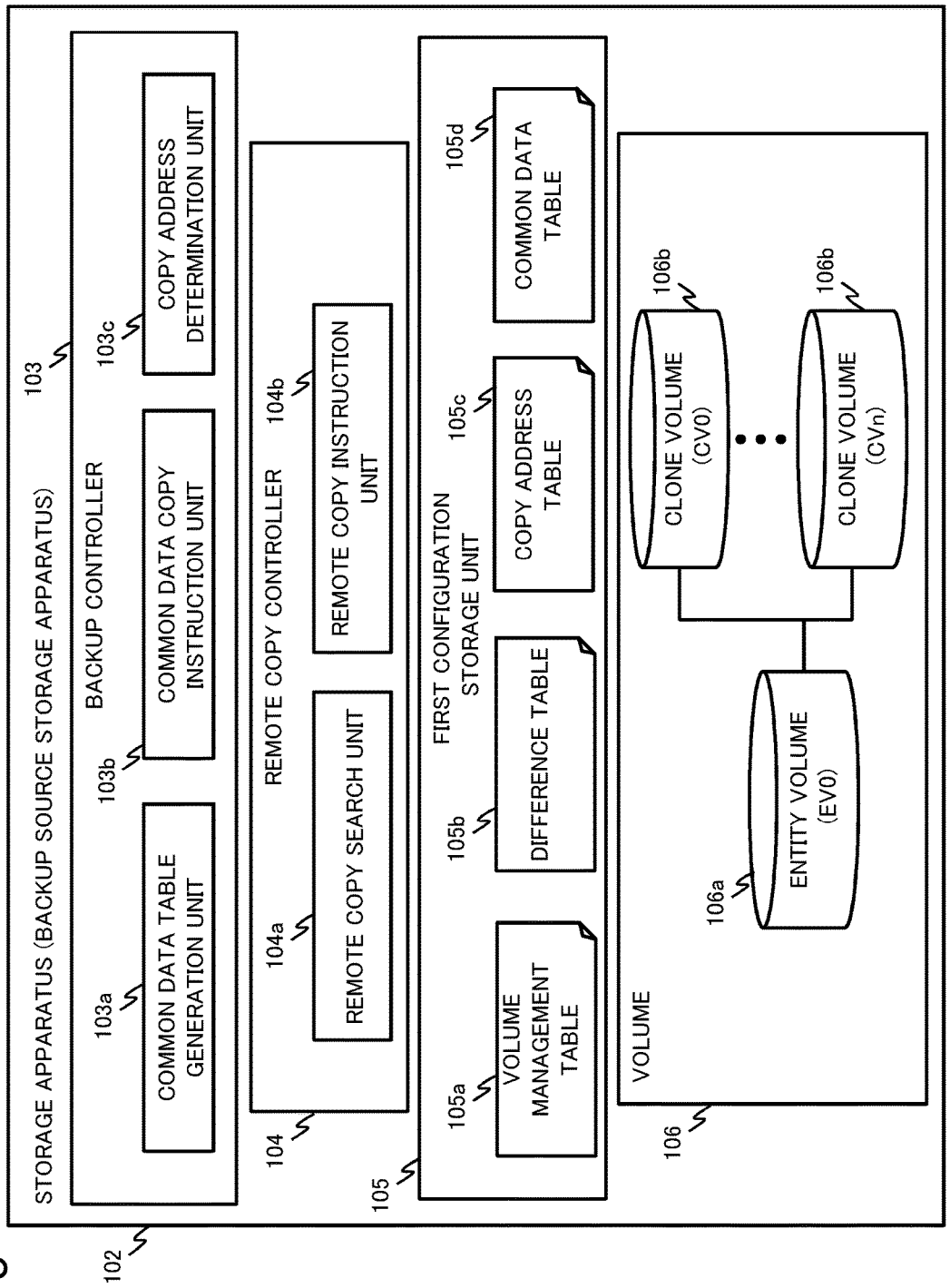
FIG. 3 is a block diagram exemplifying a functional configuration of a backup source storage apparatus according to the first example embodiment.

Referring to FIG. 3, a functional configuration of the storage apparatus 102 will be described below. A configuration exemplified in FIG. 3 is a specific configuration example of the storage apparatus 102, and the technology according to the present disclosure is not limited to the configuration exemplified in FIG. 3.

The storage apparatus 102 may be configured to include a backup controller 103, a remote copy controller 104, a first configuration storage unit 105, and a volume 106.

The backup controller 103 is configured to include a common data table generation unit 103a, a common data copy instruction unit 103b, and a copy address determination unit 103c.

The backup controller 103 receives from the host 101 an instruction to back up a clone volume 106b (to be described later) to the remote site 2 (hereinafter referred to as a "remote backup instruction"). The backup controller 103 performs processing related to the received instruction in the common data table generation unit 103a, the common data copy instruction unit 103b, and the copy address determination unit 103c, and returns a response to the host 101.

The common data table generation unit 103a refers to a volume management table 105a (to be described later) and identifies a clone volume derived from an entity volume 106a (to be described later) related to another clone volume 106b being a backup target designated by a remote backup instruction. For convenience of description, the clone volume being a backup target designated by the remote backup instruction may be hereinafter tentatively referred to as a "backup target clone volume" or a "first clone volume." Further, the entity volume 106a from which the "first clone volume" is derived may be tentatively referred to as a "derivation source entity volume." Further, another clone volume 106b derived from the "derivation source entity volume" from which the "first clone volume" is derived may be tentatively referred to as a "second clone volume." A specific configuration example of the volume management table 105a will be described later.

For example, the common data table generation unit 103a may be configured to provide processing as described below. Specifically, out of one or more second clone volumes derived from a derivation source entity volume related to a first clone volume, the common data table generation unit 103a may identify a second clone volume for which backup is already performed (started).

As an example, the common data table generation unit 103a may identify a second clone volume for which backup is started first, out of such one or more second clone volumes.

The common data table generation unit 103a identifies an area recording data common to (same data in) the first clone volume and the identified second clone volume (may be hereinafter referred to as "common data") and generates a common data table 105d including information indicating such an area (may be hereinafter referred to as a "common data area").

The common data table generation unit 103a may generate a common data table 105d for each first clone volume to be backed up. A specific configuration example of the common data table 105d will be described later.

For example, the common data table generation unit 103*a* may identify an area recording same data in the first clone volume and the identified second clone volume. For example, such an area may be identified by using an address in a clone volume.

For example, the common data copy instruction unit 103*b* may be configured to provide processing as described below. Specifically, the common data copy instruction unit 103*b* transmits an instruction (common data copy instruction) including a content of a common data table 105*d* to the storage apparatus 202 at the remote site 2.

The common data copy instruction is an instruction notifying the storage apparatus 202 of copying part of data between backup volumes 205*a* (to be described later) stored in the storage apparatus 202, based on a content of a common data table 105*d*.

For example, the common data copy instruction unit 103*b* may set a backup state (to be described later) of a first clone volume in a volume management table 105*a* to "IN PROGRESS" (for example, a value indicating "IN PROGRESS").

For example, the copy address determination unit 103*c* may be configured to provide processing as described below. Specifically, the copy address determination unit 103*c* identifies an area different from a common data area in a first clone volume as an area to be copied to the remote site 2 and generates a copy address table 105*c*. The area identified as a target to be copied to the remote site 2 in a clone volume may be hereinafter referred to as a "remote copy area." The remote copy area may be identified by using an address in a clone volume 106*b*. The remote copy area may be identified as a page in a clone volume 106*b*.

For example, for each area constituting a clone volume (for example, each range identified by an address), the copy address table 105*c* may include a flag indicating whether or not the area is a remote copy area. When the area is a remote copy area, such a flag may be set to, for example, a value "1," and, when the area is not a remote copy area, such a flag may be set to, for example, a value "0." A specific configuration example of the copy address table 105*c* will be described later.

The remote copy controller 104 is configured to include a remote copy search unit 104*a* and a remote copy instruction unit 104*b*.

For example, the remote copy search unit 104*a* may be configured to provide processing as described below. Specifically, the remote copy search unit 104*a* refers to a volume management table 105*a* and identifies a clone volume (first clone volume) for which backup to the remote site is in progress (a backup state of which is set to "IN PROGRESS").

The remote copy search unit 104*a* identifies a remote copy area from a copy address table 105*c* of the identified first clone volume. As described above, the remote copy area is an area to be copied to the remote site 2. For example, the remote copy search unit 104*a* may determine an area (for example, an address) to which a flag indicating a remote copy area is set in the copy address table 105*c* to be a copy target.

When an area to be copied does not exist (a remote copy area does not exist) with respect to a certain first clone volume, the remote copy search unit 104*a* may set a backup state of the clone volume in the volume management table 105*a* to "DONE" (for example, a value indicating "DONE").

For example, the remote copy instruction unit 104*b* may be configured to provide processing as described below. Specifically, the remote copy instruction unit 104*b* reads data in a remote copy area in a first clone volume determined by the remote copy search unit 104*a* from the first clone volume.

The remote copy instruction unit 104*b* transmits to the storage apparatus 202 an instruction (remote copy instruction) instructing to write the read data in the remote copy area onto a backup volume 205*a* in the storage apparatus 202. For example, such a remote copy instruction may include information (for example, an address) by which a write destination area can be identified and data to be written (data in the remote copy area).

When receiving a response from the storage apparatus 202, the remote copy instruction unit 104*b* may set a flag indicating completion of copying to a remote copy area copying of which to the remote site 2 is completed, in a copy address table 105*c*. For example, the remote copy instruction unit 104*b* may set a flag of a remote copy area copying of which to the remote site 2 is completed to "0" in the copy address table 105*c*.

The first configuration storage unit 105 may be configured to include a volume management table 105*a*, a difference table 105*b*, a copy address table 105*c*, and a common data table 105*d*. A data structure capable of providing the respective tables is not particularly limited. For example, each table may include various types of data by using a table structure and a database, and may include data by a data structure other than the table structure.

The volume management table 105*a* is a table configured to include a relation between an entity volume 106*a* and a clone volume 106*b* (to be described later), and a correspondence between a clone volume backed up to the remote site and a backup volume.

FIG. 5 is a diagram illustrating a specific example of the volume management table 105*a*. The volume management table 105*a* includes identification information (entity volume number 501) by which an entity volume can be identified, identification information (clone volume number 502) by which a clone volume can be identified, and identification information (backup volume number 503) by which a backup volume related to a clone volume can be identified. For example, the pieces of identification information may be expressed by volume numbers. The pieces of identification information may be associated with one another.

Further, for each clone volume, the volume management table 105*a* may include a state of backup processing to the remote site 2 (backup state 504) and an order of starting backup (backup start order 505). As a specific example, the backup state 504 may be set with a value ("DONE") indicating that a certain clone volume is already backed up. The backup state 504 may be set with a value ("IN PROGRESS") indicating that backup related to a certain clone volume is in progress. The backup state 504 may be set with a value ("UNPROCESSED") indicating that a certain clone volume is not backed up.

For each area in a clone volume, the difference table 105*b* includes information (difference information) indicating whether or not data different from an entity volume being a derivation source are stored. Such difference information may be represented by a flag. An area to which a flag is set in a clone volume may be hereinafter referred to as a "page." For example, such a page may be identified by using an address (or an address range).

FIG. 6 is a diagram illustrating a specific example of the difference table 105*b*. For each clone volume, the difference table 105*b* includes a flag indicating whether or not data different from an entity volume being a derivation source are stored, for each page identified by a page number 601. For example, when a certain page is set with "1" as a flag, data different from the entity volume are stored in the page in the clone volume. In other words, in this case, actual data exist (i.e. actual data are stored) in the page in the clone volume. For example, when a certain page is set with "0" as a flag, data in the page in the clone volume are identical to data in the page in the entity volume. In other words, in this case, actual data do not exist (i.e. actual data are not stored) in the page in the clone volume, and, when the page is accessed, the data in the page in the entity volume may be referred to.

For example, the common data table generation unit 103a is able to perform a logical operation (for example, logical addition [OR]) on flag values ("0" or "1") for each page, with respect to a clone volume 106b and another clone volume 106b. Consequently, the common data table generation unit 103a is able to readily determine whether or not common data (data without difference from an entity volume 106a in particular) are included for each page in the two clone volumes 106b.

For example, in FIG. 6, "page 2" in a clone volume CV0 is set with "1" as a flag, and therefore actual data exist in "page 2" in the clone volume CV0. On the other hand, "page 3" in the clone volume CV0 is set with "0" as a flag, and therefore actual data do not exist in "page 3" in the clone volume CV0. When "page 3" in the clone volume CV0 is accessed, "page 3" in the entity volume is referred to.

As exemplified in FIG. 6, the difference table 105b may be configured as a table including every clone volume 106b stored in the storage apparatus 102. As another specific example, the difference table 105b may be configured as a separate table for each clone volume 106b.

For example, when a clone volume 106b is derived from an entity volume 106a in the storage apparatus 102, a difference table 105b related to the clone volume 106b may be generated. When the difference table 105b is generated, each area (page) in the clone volume may be set with "0" as a flag, as an initial value.

When access to a clone volume 106b occurs while the storage apparatus 102 is in operation, the storage apparatus 102 suitably sets a flag in the difference table 105b. For example, it is assumed that write, deletion, change, or the like of data occurs in a certain area (page) in a clone volume 106b. In this case, different data may be stored in a page in the clone volume 106b and a page corresponding to the page in the entity volume 106a. In this case, such a page is set with "1" as a flag in the difference table 105b. Further, when data in a certain area (page) in the clone volume 106b are identical to data in a page corresponding to such a page in the entity volume 106a, such a page may be set with "0" as a flag in the difference table 105b.

The copy address table 105c is configured to include, for each area (page) in each clone volume, a flag indicating whether or not data copying to the remote site 2 is performed.

FIG. 7 is a diagram illustrating a specific example of the copy address table 105c. For each page identified by a page number 701, the copy address table 105c includes a flag indicating whether or not to copy the page to the remote site 2, with respect to a clone volume identified by a clone volume number 702. For example, when a certain page is set with "1" as a flag, data in the page in the clone volume are copied to the remote site 2. For example, when a certain page is set with "0" as a flag, there is no need to copy data in the page in the clone volume to the remote site 2. In this case, for example, such a page is already copied to the remote site 2, or is a page that does not need to be copied.

For example, in FIG. 7, "page 1" in a clone volume CV2 is set with a flag "1," and therefore data in "page 1" need to be copied to the remote site 2. On the other hand, "page 0" in a clone volume CV1 is set with a flag "0," and therefore there is no need to copy data in "page 2" to the remote site 2.

For each page in a first clone volume to be backed up, the common data table 105d is configured to include a flag indicating whether or not data in common with a corresponding page in a second clone volume are stored.

Figure 8:
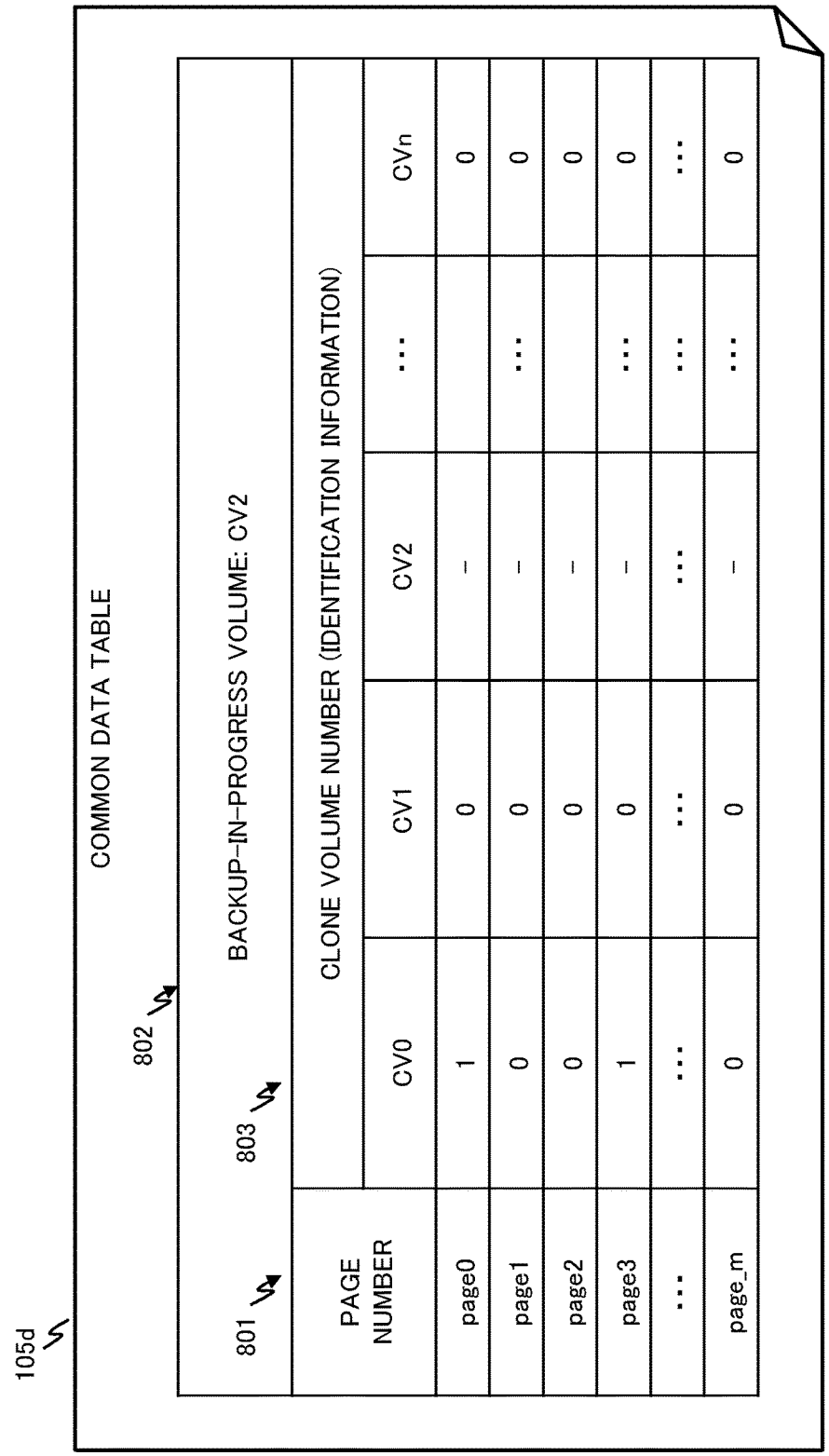
FIG. 8 is a diagram illustrating a specific example of a table (part 4) including information about a volume included in the storage apparatus according to the first example embodiment.

FIG. 8 is a diagram illustrating a specific example of the common data table 105d. For example, in the common data table 105d, a backup-in-progress volume 802 represents a first clone volume being backed up. Further, a clone volume number 803 represents a second clone volume that is already backed up or being backed up, the second clone volume being derived from an entity volume being a derivation source of the first clone volume. The common data table 105d includes information (common data information) indicating whether or not each page (page number 801) in the first clone volume stores data in common with a corresponding page in a second clone volume (common data). The common data information may be indicated by a flag. For example, when a certain page is set with "1" as a flag, the page in the first clone volume and the page in the second clone volume store common data. On the other hand, when a certain page is set with "0" as a flag, the page in the first clone volume and the page in the second clone volume store different data.

For example, in the specific example illustrated in FIG. 8, a clone volume CV2 is a first clone volume to be backed up. Meanwhile, "page 0" in a clone volume CV0 is set with a flag "1." Such a flag indicates that "page 0" in the clone volume CV2 and "page 0" in the clone volume CV0 store identical data. On the other hand, "page 0" in a clone volume CV1 is set with "0" as a flag. Such a flag indicates that "page 0" in the clone volume CV2 and "page 0" in the clone volume CV1 store different data.

The volume 106 is configured to include an entity volume 106a and a clone volume 106b.

The entity volume 106a corresponds to a master image in the linked clone method, and is a volume storing data common to one or more clone volumes 106b.

For example, the clone volume 106b is a virtual volume on a virtual machine used by a user, and stores difference data from the entity volume 106a. A plurality of clone volumes 106b may exist for one entity volume 106a. For example, in the case of the linked clone method, a clone volume 106b derived from an entity volume 106a may be allocated for each virtual machine.

Figure 4:
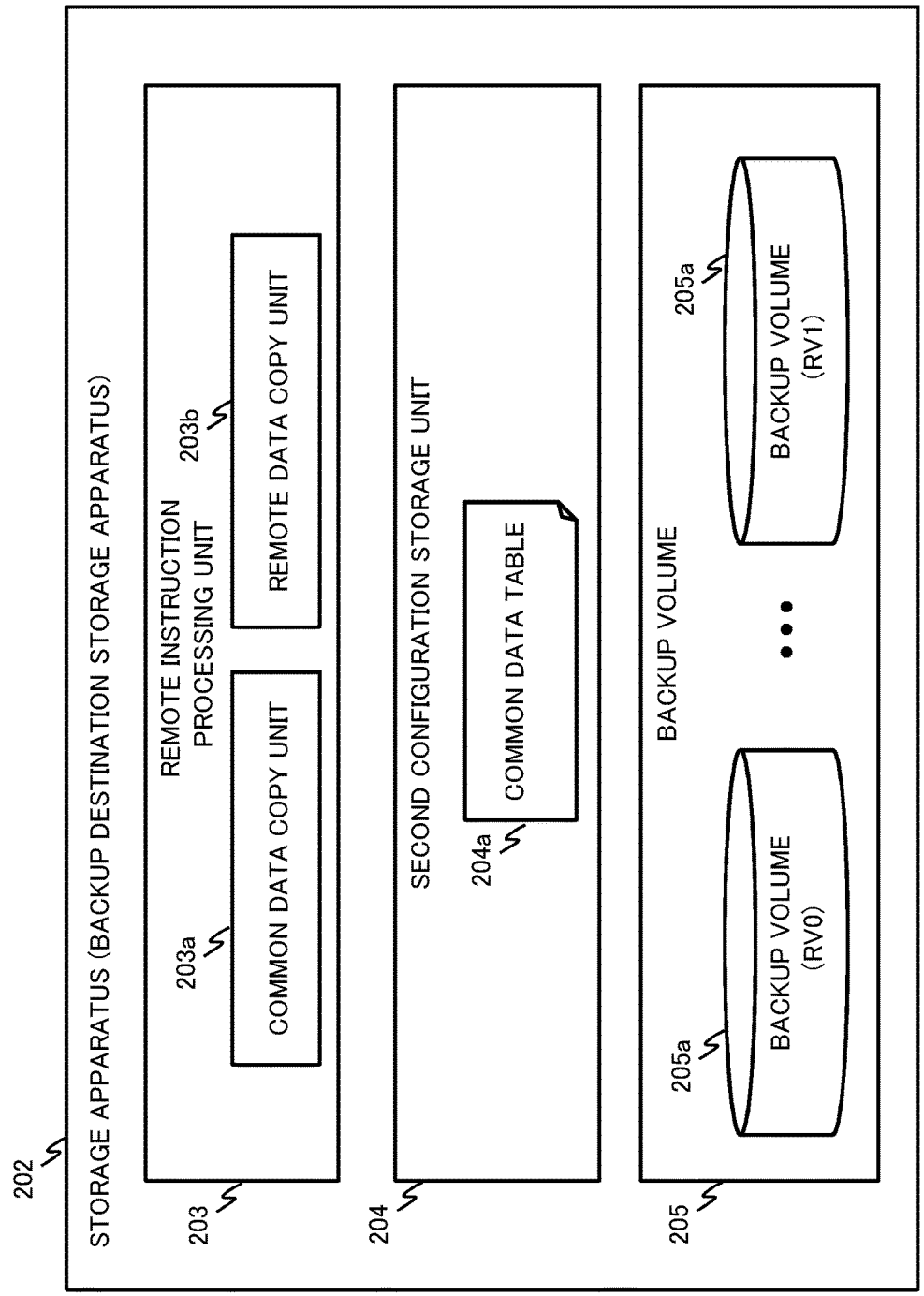
FIG. 4 is a block diagram exemplifying a functional configuration of a backup destination storage apparatus according to the first example embodiment.

Referring to FIG. 4, a specific configuration of the storage apparatus 202 will be described below. A configuration exemplified in FIG. 4 is a specific configuration example of the storage apparatus 202, and the technology according to the present disclosure is not limited to the configuration exemplified in FIG. 4.

The storage apparatus 202 is configured to include a remote instruction processing unit 203, a second configuration storage unit 204, and a backup destination volume 205.

The remote instruction processing unit 203 is configured to include a common data copy unit 203a and a remote data copy unit 203b, and provide processing as described below.

The remote instruction processing unit 203 receives various types of instructions from the storage apparatus 102 and determines a type of received instruction. An instruction received from the storage apparatus 102 may be hereinafter referred to as a remote instruction. For example, the remote instruction may include a "common data copy instruction" and a "remote copy instruction" that are described above.

For example, the remote instruction processing unit 203 performs processing in at least either of the common data copy unit 203*a* or the remote data copy unit 203*b* in accordance with a received remote instruction and returns a response to the storage apparatus 102.

The common data copy unit 203*a* is configured to provide processing as described below. Specifically, the common data copy unit 203*a* stores a content of a common data table included in a received common data copy instruction into a common data table 204*a*.

The common data copy unit 203*a* waits for completion of backup processing related to a backup volume being a copy source of common data designated by the common data copy instruction (i.e. backup processing related to a second clone volume).

The common data copy unit 203*a* identifies, in the backup volume, a page to which a flag "1" is set in the common data table 204*a*. The common data copy unit 203*a* may identify an address of such a page.

The common data copy unit 203*a* reads data in the page identified above from the backup volume (a backup volume of the second clone volume) being the copy source and copies the data to a backup destination backup volume (a backup volume of the first clone volume). Consequently, in the storage apparatus 202 being a backup destination of each clone volume, at least part of data are copied to a backup volume of the first clone volume from a backup volume of the second clone volume for which backup is already completed.

The remote data copy unit 203*b* is configured to provide processing as described below. Specifically, the remote data copy unit 203*b* writes data received by a remote copy instruction (data in a remote copy area) onto a specific area in a backup volume, the area being a backup destination designated by the remote copy instruction. The write destination of the data received by the remote copy instruction may be designated by a page number or may be designated by an address.

The second configuration storage unit 204 is configured to include the common data table 204*a*. A data structure capable of providing such a table is not particularly limited. For example, such a table may include various types of data by using a table structure and a database, or may include data by a data structure other than the table structure.

The common data table 204*a* is configured to include a content of a common data table received by a common data copy instruction. For example, a specific configuration of the common data table 204*a* may be similar to the common data table 105*d*.

The backup destination volume 205 includes one or more backup volumes 205*a*. A backup volume 205*a* is a backup of a clone volume 106*b* stored in the storage apparatus 102. Each backup volume 205*a* may correspond one-to-one to a clone volume 106*b*. Further, one backup volume 205*a* may record backup data of a plurality of clone volumes 106*b*. In this case, for example, the backup volume 205*a* may be partitioned into a plurality of areas, and the respective areas may record backup data of different clone volumes 106*b*.

(Operation)

Referring to drawings, an operation of the storage apparatus according to the present example embodiment will be described below. Flowcharts exemplified in the respective drawings below illustrate specific examples of the operation of the storage apparatus, and the technology according to the present disclosure is not limited thereto. Further, execution order of processing steps (Steps) in each flowchart may be changed without influencing a processing result, and one or more processing steps (Steps) may be performed in parallel.

Figure 9:
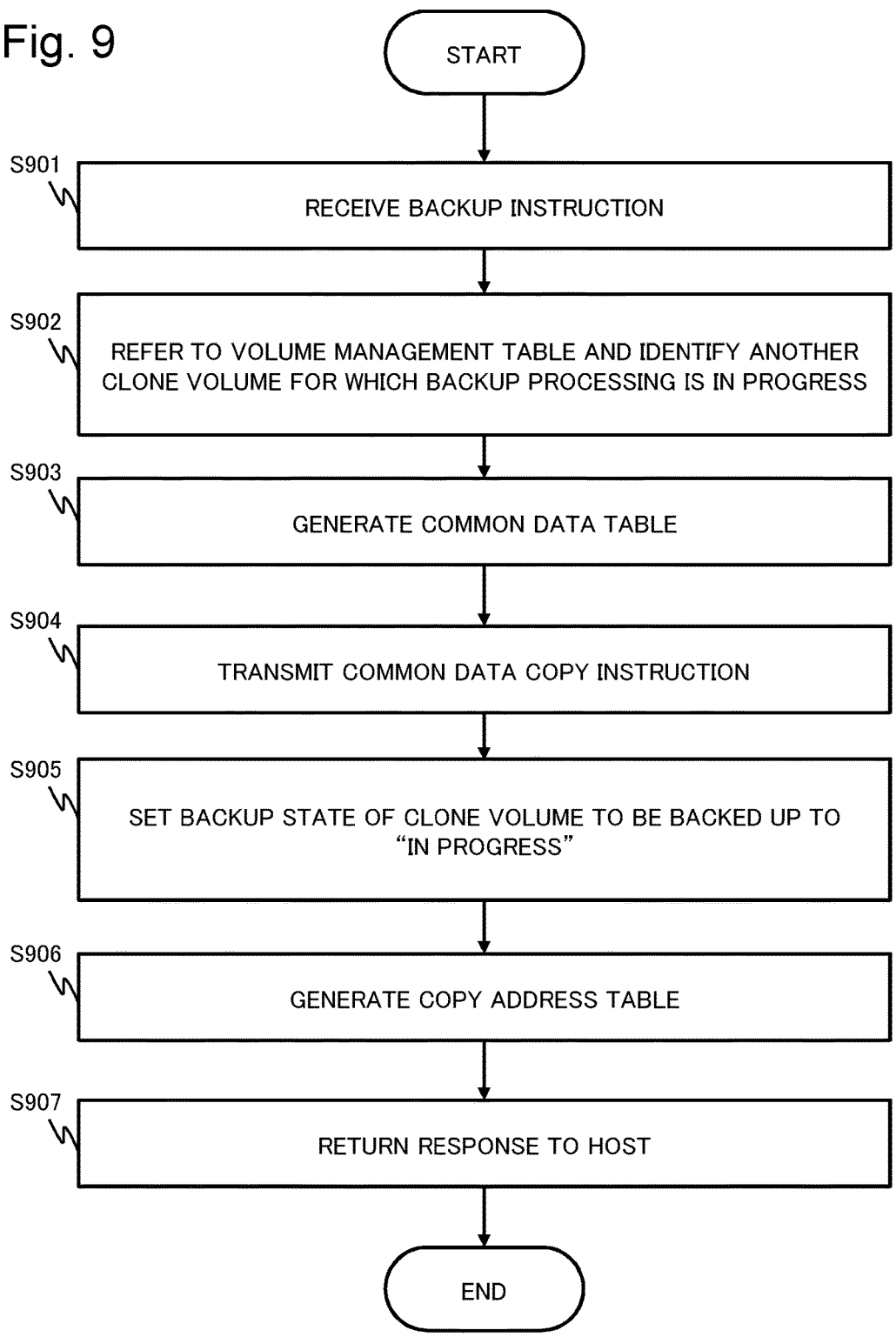
FIG. 9 is a flowchart illustrating an operation (transmission of a common data copy instruction) of the storage apparatus according to the first example embodiment.

FIG. 9 is a flowchart illustrating remote backup instruction processing.

The backup controller 103 in the storage apparatus 102 receives from the host 101 a backup instruction instructing backup of a clone volume (Step S901).

The common data table generation unit 103*a* refers to the volume management table 105*a* and identifies a clone volume 106*b* (first clone volume) which is a backup target designated by the received backup instruction. The common data table generation unit 103*a* identifies a derivation source entity volume (entity volume 106*a*) of the identified first clone volume. Then, among other clone volumes 106*b* (second clone volumes) derived from the identified derivation source entity volume, the common data table generation unit 103*a* identifies a clone volume 106*b* for which backup processing is started (Step S902)

For example, the common data table generation unit 103*a* may identify a clone volume 106*b* for which backup is started first as a second clone volume. It is considered that backup of a clone volume 106*b* for which backup is started first is likely to complete first. Consequently, it is considered that copying between backup volumes 205*a* in the storage apparatus 202 at the remote site 2 may be performed relatively early.

Without being limited to the above, the common data table generation unit 103*a* may identify a second clone volume by using another suitable criterion. For example, among clone volumes 106*b* for which backup processing is already performed, the other clone volumes 106*b* being derived from a same derivation source entity volume as the first clone volume, the common data table generation unit 103*a* may identify a clone volume 106*b* with the least difference from the first clone volume as a second clone volume. In this case, relatively large amount of data can be copied between backup volumes 205*a* in the storage apparatus 202 at the remote site 2. Consequently, an amount of data transferred from the primary site 1 to the remote site 2 can be reduced.

The common data table generation unit 103*a* refers to difference tables 105*b* and generates a common data table 105*d* from difference information about the first clone volume identified above and difference information about a second clone volume (Step S903)

A generation procedure of the common data table 105*d* will be described below. The common data table generation unit 103*a* calculates a logical disjunction (OR) for each area (page) with respect to a difference table 105*b* of a second clone volume and a difference table 105*b* of the first clone volume. That is to say, the common data table generation unit 103*a* calculates a logical disjunction (OR) of a flag value ("0" or "1") in the difference table 105*b* of the second clone volume and a flag value ("0" or "1") of the difference table 105*b* of the first clone volume.

The common data table generation unit 103*a* generates a common data table 105*d* by identifying an area (page) for which a flag value is calculated to be "0" as a result of such calculation as a common data area recording common data. The area for which a flag value is calculated to be "0" as a result of the calculation is an area for which both a flag value in the difference table 105*b* of the first clone volume and a flag value in the difference table 105*b* of the second clone volume are "0." In other words, such an area is an area without a difference from a corresponding area in the entity volume being a derivation source. The common data table generation unit 103a inverts the calculation result (flag value) and sets the value to the common data table 105d. When a second clone volume does not exist, the common data table generation unit 103a may set every flag in the common data table 105d to "0."

Figure 10:
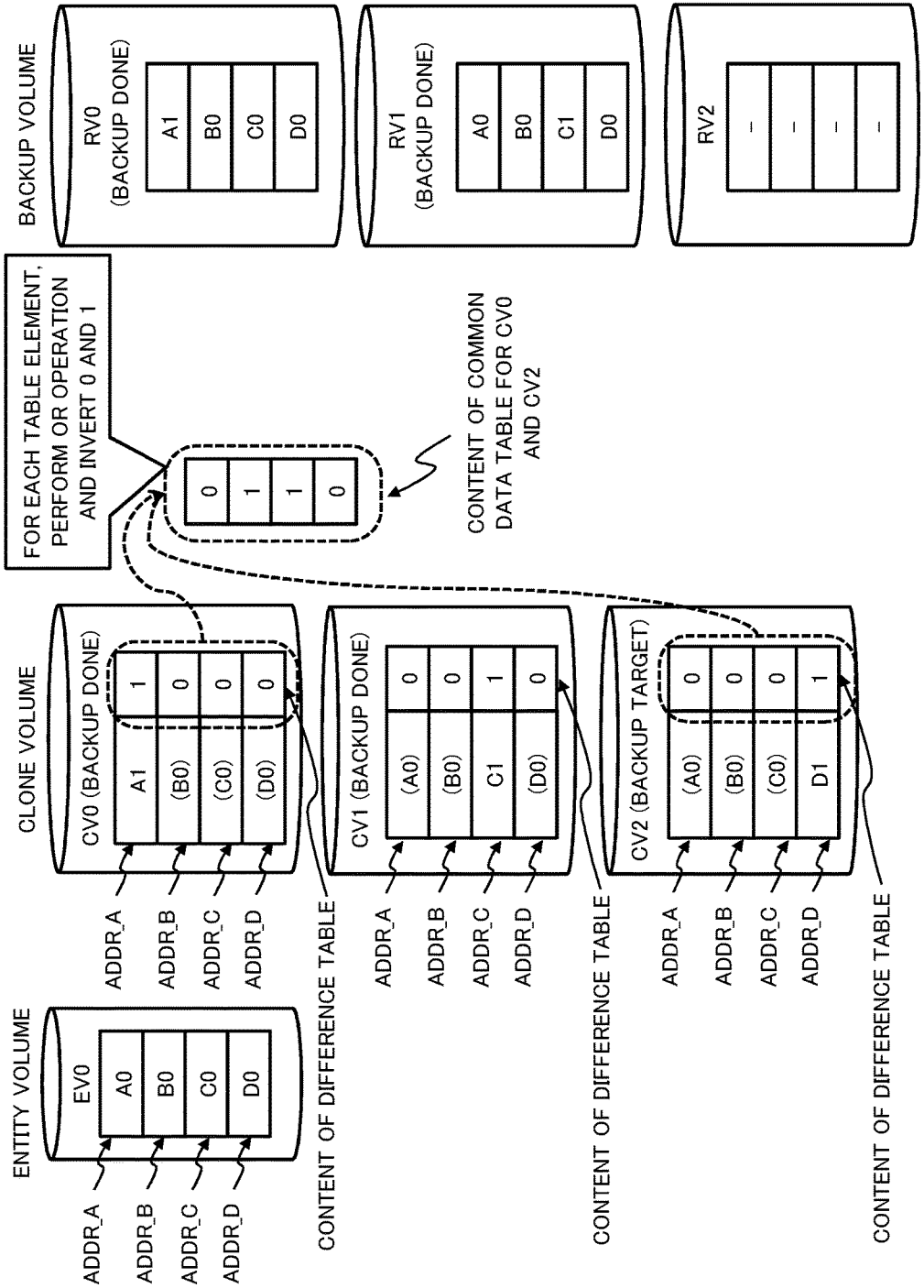
FIG. 10 is a diagram (part 1) schematically illustrating processing related to data copying according to the first example embodiment.

Using a specific example illustrated in FIG. 10, the generation procedure of the common data table 105d will be described. In the case of the specific example illustrated in FIG. 10, clone volumes CV0, CV1, and CV2 are derived from a common entity volume EV0. The clone volume CV2 is a first clone volume being a backup target. Backup processing for the clone volumes CV0 and CV1 are already completed. In FIG. 10, for convenience of description, part of a difference table 105b of each clone volume is illustrated.

In the entity volume EV0, an area (page) ADDR_A stores data "A0," an area (page) ADDR_B stores data "B0," an area (page) ADDR_C stores data "C0," and an area (page) ADDR_D stores data "D0."

The clone volume CV0 stores data ("A1") different from the entity volume EV0 for the area (page) ADDR_A, and there is no difference from the entity volume EV0 for the other areas.

The clone volume CV1 stores data ("C1") different from the entity volume EV0 for the area (page) ADDR_C, and there is no difference from the entity volume EV0 for the other areas.

The clone volume CV2 stores data ("D1") different from the entity volume EV0 for the area (page) ADDR_D, and there is no difference from the entity volume EV0 for the other areas.

When the host 101 instructs backup of the clone volume CV2, for example, the common data table generation unit 103a identifies the clone volume CV0 as a second clone volume. The common data table generation unit 103a calculates a logical disjunction (OR) of the difference table 105b of the clone volume CV2 and the difference table 105b of the clone volume CV0. The common data table generation unit 103a generates a common data table 105d for the clone volumes CV2 and CV0 by determining a page with a flag value of the calculation result being "0" to be a common data area. When generating the common data table 105d, the common data table generation unit 103a inverts (changing "0" to "1" and changing "1" to "0") flag values of the calculation result. The common data copy instruction unit 103b transmits a common data copy instruction including a content of the common data table 105d and information (for example, volume number) by which a backup volume storing a common data area can be identified to the storage apparatus 202 at the remote site (Step S904).

The common data copy instruction unit 103b sets a backup state 504 of the first clone volume in the volume management table 105a to a value indicating "IN PROGRESS" (Step S905). At this time, the common data copy instruction unit 103b may set a backup start order 505.

The copy address determination unit 103c identifies an area (page) to which a flag "0" is set in the common data table 105d. The copy address determination unit 103c generates a copy address table 105c by determining the area to be an area including copy target data (Step S906). As an example, the copy address determination unit 103c may generate the copy address table 105c by inverting a flag in the common data table 105d.

Figure 11:
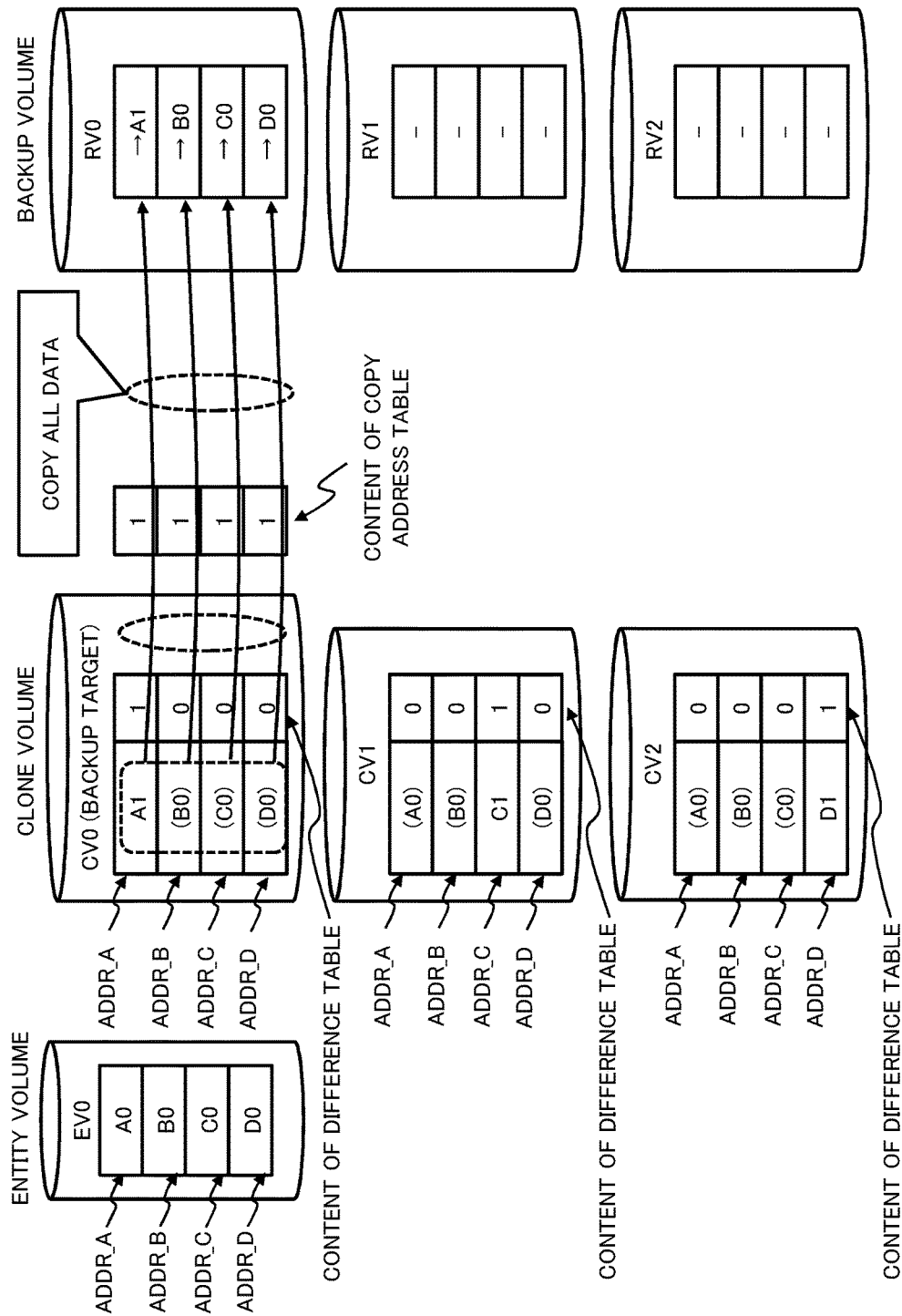
FIG. 11 is a diagram (part 2) schematically illustrating processing related to data copying according to the first example embodiment.
Figure 12:
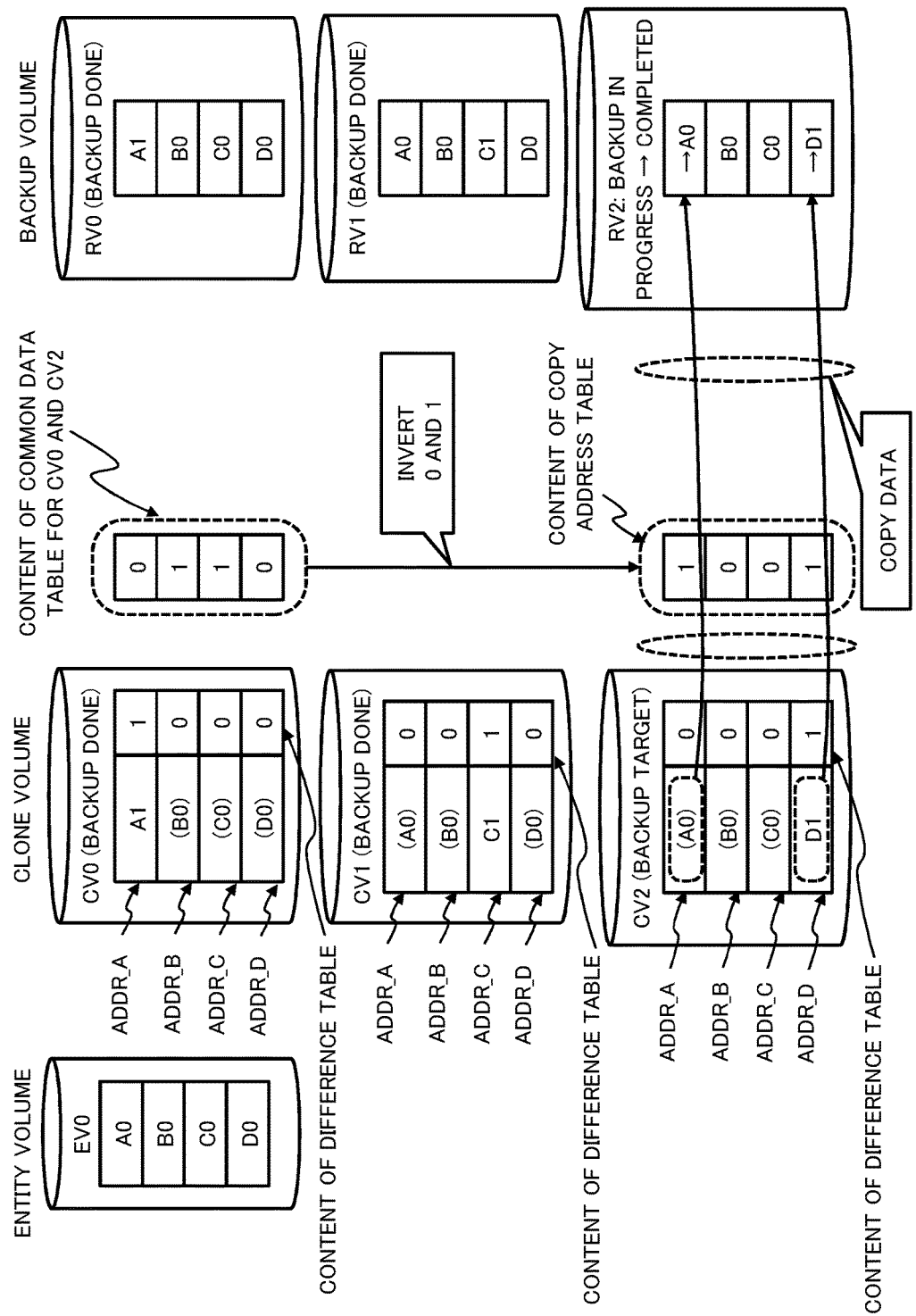
FIG. 12 is a diagram (part 3) schematically illustrating processing related to data copying according to the first example embodiment.

Using specific examples illustrated in FIGS. 11 and 12, a generation procedure of the copy address table 105c will be described. In FIGS. 11 and 12, for convenience of description, parts of a clone volume, a difference table, and a copy address table are illustrated in a simplified manner.

It is assumed in FIG. 11 that a clone volume CV0 is a clone volume to be backed up first (i.e. a clone volume to be backed up first, out of clone volumes derived from an entity volume EV0).

In this case, another clone volume backed up at the remote site 2 does not exist. That is to say, a backup volume of another clone volume including common data does not exist in the storage apparatus 202. Consequently, with regard to the clone volume CV0, every page (ADDR_A to ADDR_D) is registered in the copy address table 105c as a copy target. Specifically, every page in the copy address table 105c is set with "1" as a flag. Based on a content of such a copy address table 105c, data in every page in the clone volume CV0 are copied to a backup volume RV0 in the storage apparatus 202.

It is assumed in FIG. 12 that clone volumes CV0 and CV1 are already backed up and a clone volume CV2 is to be backed up. A common data table 105d is generated from difference tables 105b of the clone volumes CV0 and CV2. A content of the common data table 105d to be generated is similar to the common data table 105d exemplified in FIG. 10. The clone volume CV2 is a clone volume to be backed up second or later, and therefore the clone volume CV0 is already backed up. The copy address determination unit 103c identifies a page set with "0" as a flag in the common data table 105d for the clone volumes CV0 and CV2 as a copy target. For example, the copy address determination unit 103c may generate the copy address table 105c by inverting a flag value (inverting "0" and "1") in the common data table 105d for the clone volumes CV0 and CV2.

When generation of the copy address table 105c is completed, the backup controller 103 transmits a response to the host 101 (Step S907).

Figure 13:
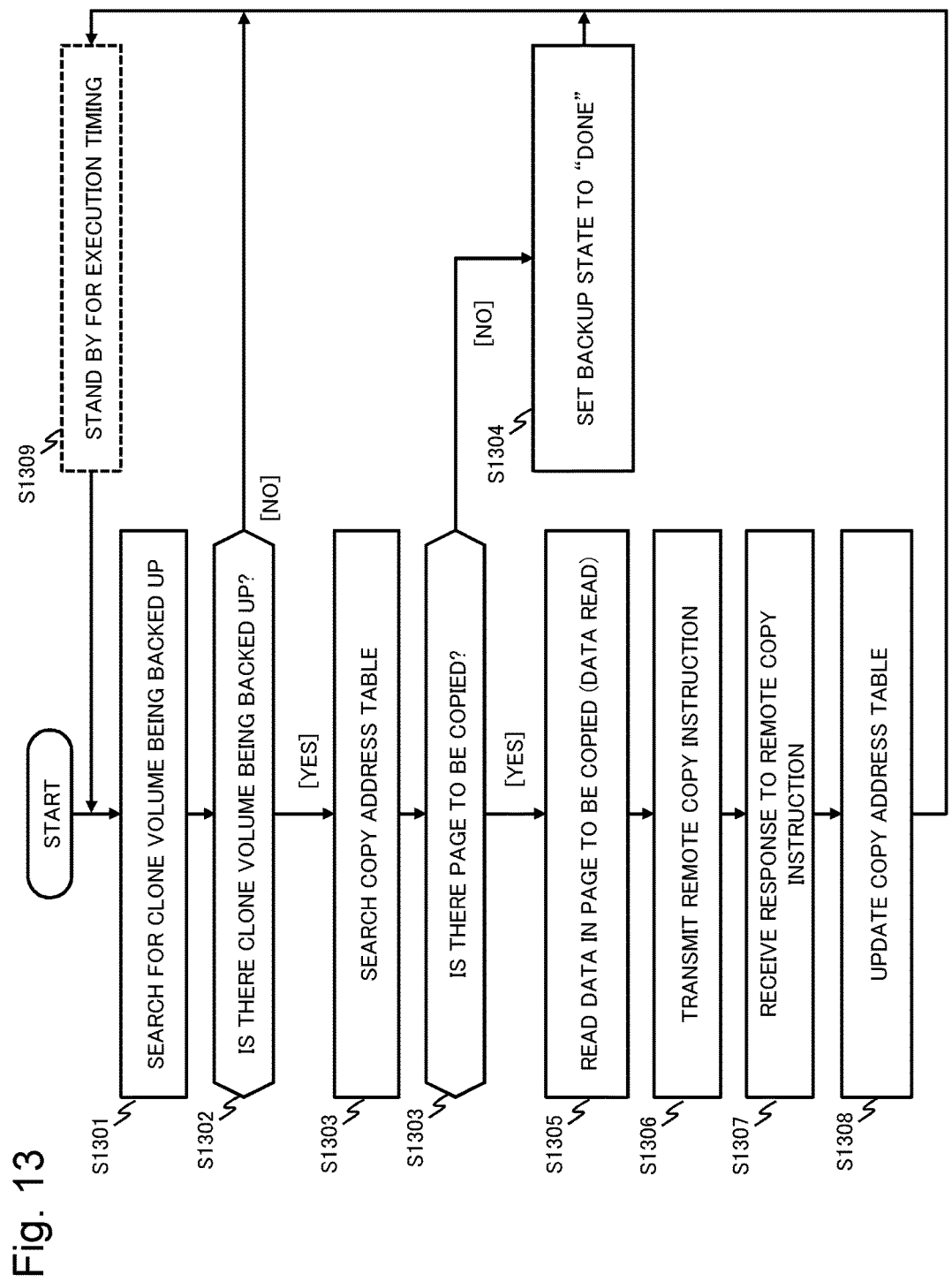
FIG. 13 is a flowchart illustrating an operation (transmission of a remote copy instruction) of the backup source storage apparatus according to the first example embodiment.

Referring to FIG. 13, transmission processing of a remote copy instruction will be described below.

The transmission processing of a remote copy instruction is performed at a suitable timing. For example, such processing may be performed periodically (at every certain time).

The remote copy search unit 104a in the remote copy controller 104 refers to the volume management table 105a and identifies a clone volume being backed up (Steps S1301 and S1302).

When a clone volume being backed up does not exist ([NO] in Step S1302), the remote copy search unit 104a may end the processing. At this time, for example, the remote copy search unit 104a may stand by for a next execution timing (Step S1309)

When identifying a clone volume being backed up ([YES] in Step S1302), the remote copy search unit 104a searches a content of a copy address table 105c in the identified clone volume (Step S1303). Specifically, the remote copy search unit 104a searches the copy address table 105c for a page that needs to be copied to the remote site 2 (storage apparatus 202). For example, the remote copy search unit 104a may search the copy address table 105c for a page set with a flag "1."

When a page that needs to be copied to the remote site 2 (for example, a page set with a flag "1") does not exist ([NO] in Step S1303), the remote copy search unit 104a updates a backup state of the clone volume identified in Step S1301. In this case, for example, with regard to the clone volume identified in Step S1301, the remote copy search unit 104a sets the backup state 504 in the volume management table 105a to a value indicating "DONE" (Step SS1304) and ends the processing. For example, the remote copy search unit 104a may stand by for a next execution timing (Step S1309).

When identifying a page that needs to be copied to the remote site 2 (for example, a page set with a flag "1") ([YES] in Step S1303), the remote copy instruction unit 104b reads data in the page in the clone volume being backed up (the clone volume identified in Step S1301) (Step S1305).

The remote copy instruction unit 104b transmits a remote copy instruction including the read data to the storage apparatus 202 at the remote site 2 (Step S1306). Such a remote copy instruction may include information by which an area onto which data are written can be identified (for example, an address in a backup volume being a copy destination).

The remote copy instruction unit 104b receives a response from the remote site 2 (Step S1307) and updates the copy address table 105c (Step S1308). For example, the remote copy instruction unit 104b may set a flag "0" to a page for which copying is completed (a page for which a response is received from the remote site 2) in the copy address table 105c. The remote copy instruction unit 104b may end the processing after performing Step S1308. When the processing in the remote copy instruction unit 104b ends, for example, the remote copy search unit 104a may stand by for a next execution timing (Step S1309).

Figure 14:
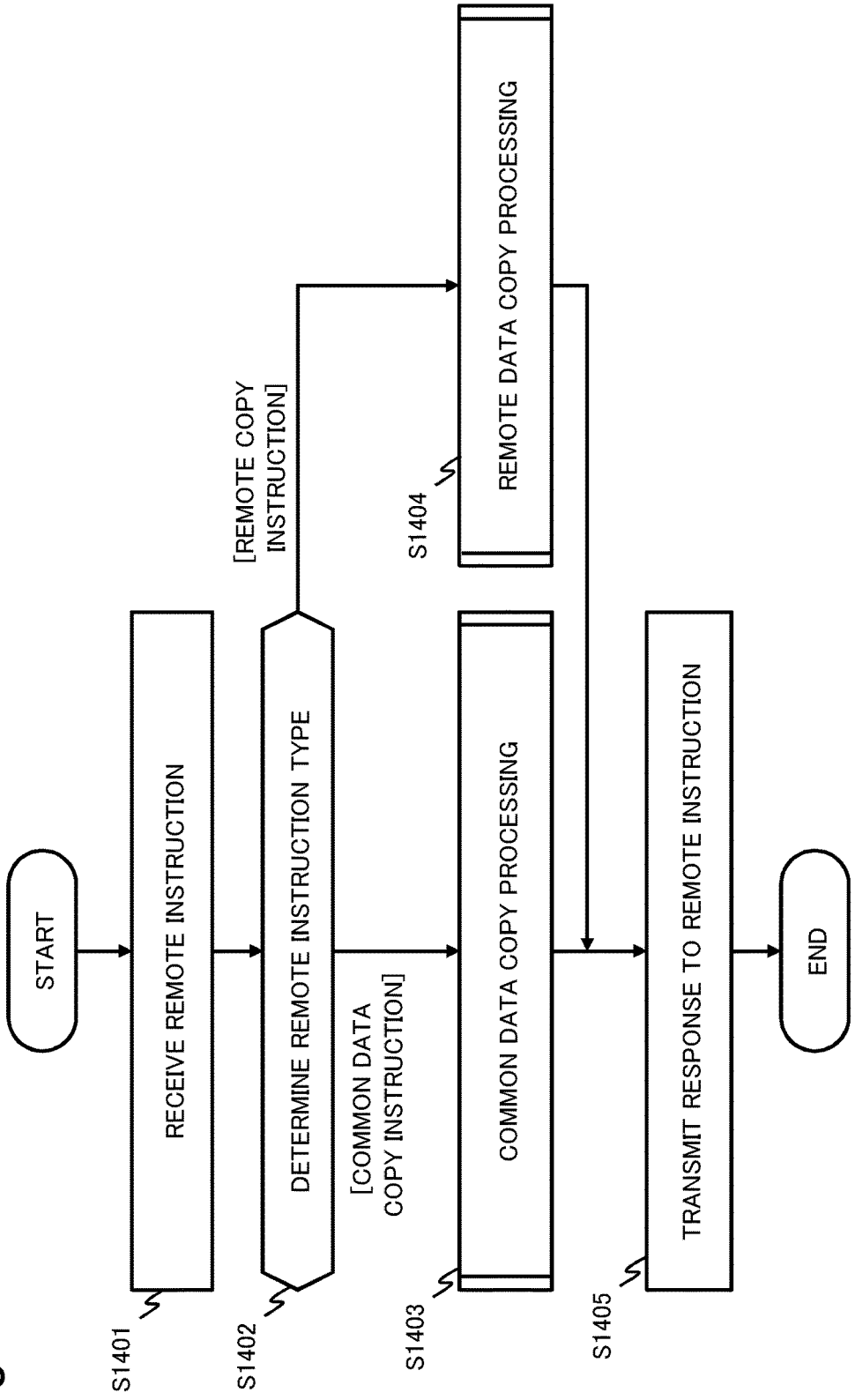
FIG. 14 is a flowchart (part 1) illustrating an operation of the backup destination storage apparatus according to the first example embodiment.

Referring to FIG. 14, remote instruction processing at the remote site 2 (storage apparatus 202) will be described below.

In the storage apparatus 202 at the remote site 2, the remote instruction processing unit 203 receives a remote instruction from the storage apparatus 102 at the local site (Step S1401).

The remote instruction processing unit 203 determines a type of the remote instruction (Step S1402). Specifically, for example, the remote instruction processing unit 203 may determine whether or not the remote instruction is a "common data copy instruction."

When a common data copy instruction is received as a remote instruction ([common data copy instruction] in Step S1402), common data copy processing (to be described later) is performed (Step S1403). When a remote copy instruction is received as a remote instruction ([remote copy instruction] in Step S1402), remote data copy processing (to be described later) is performed (Step S1404). The remote instruction processing unit 203 returns a response to the remote instruction to the source of the remote instruction (Step S1405).

Figure 15:
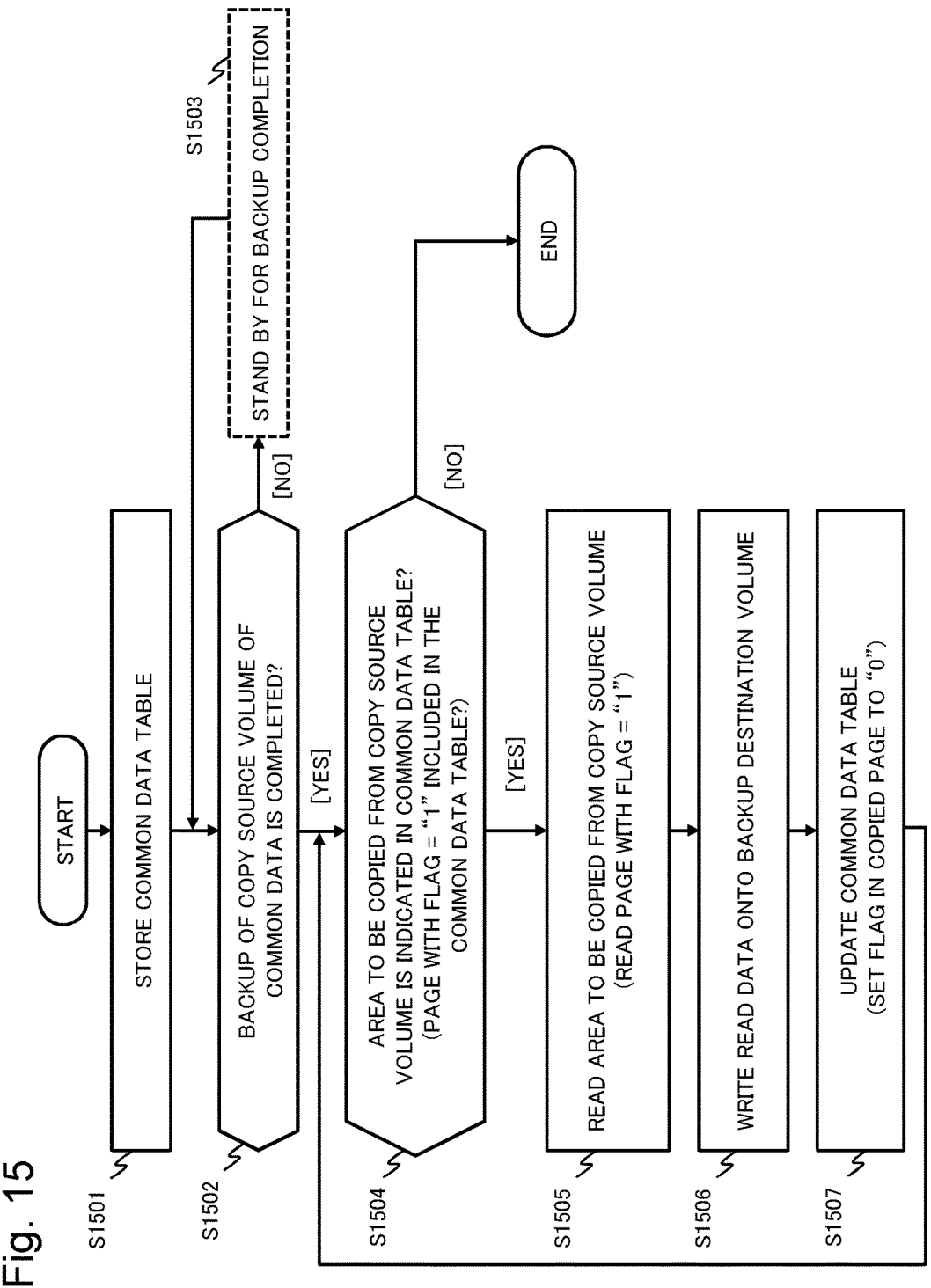
FIG. 15 is a flowchart (part 2) illustrating an operation of the backup destination storage apparatus according to the first example embodiment.

Referring to FIG. 15, the common data copy processing will be described below.

The common data copy unit 203a stores a content of a common data table included in a common data copy instruction into the common data table 204a in the storage apparatus 202 (Step S1501). As described above, the common data table included in the common data copy instruction includes information (flag) by which an area (page) storing data common to (identical in) a first clone volume and a second clone volume in the storage apparatus 102 can be identified.

The common data copy unit 203a checks whether backup processing related to a backup volume 205a being a copy source of the common data designated by the common data copy instruction is completed (Step S1502).

The backup volume 205a which is the copy source of the common data designated by the common data copy instruction corresponds to a backup volume of the second clone volume. For example, the common data copy unit 203a may check whether or not backup processing related to the second clone volume is completed.

When the backup processing related to the backup volume 205a which is the copy source is not completed ([NO] in Step S1502), the common data copy unit 203a waits for completion of such backup processing (Step S1503).

When the backup processing related to the backup volume 205a being the copy source is completed ([YES] in Step S1502), the common data copy unit 203a refers to the common data table 204a.

The common data copy unit 203a checks whether an area (page) to be copied from the backup volume 205a as the copy source to a backup volume 205a as a copy destination is indicated in the common data table 204a (Step S1504). Specifically, the common data copy unit 203a checks whether the common data table 204a includes a page to which "1" is set as a flag.

When the common data table 204a includes a page to which "1" is set as a flag ([YES] in Step S1504), the common data copy unit 203a reads data in the page from the backup volume 205a being the copy source (Step S1505).

The common data copy unit 203a copies the read data to a same page in the backup volume 205a as the copy destination (Step S1506). The backup volume 205a as the copy destination corresponds to a backup volume of the first clone volume. Data are copied from the backup volume 205a of the second clone volume to the backup volume 205a of the first clone volume.

The common data copy unit 203a updates the common data table 204a (Step S1507). In this case, for example, the common data copy unit 203a may set a flag of the page for which copying from the copy source to the copy destination is completed to "0" in the common data table 204a.

The common data copy unit 203a continues the processing from Step S1504.

When the common data table 204a does not include a page to which "1" is set as a flag ([NO] in Step S1504), the common data copy unit 203a ends the processing.

In the wait processing for backup completion in Step 1503, the common data copy unit 203a may handle whether backup is completed, for each area (for example, each page) in the backup volume. For example, the common data copy unit 203a may sequentially perform copying of common data from an area (for example, a page) for which backup is completed. The common data copy unit 203a may identify an area in the backup volume by using an address.

Using a specific example illustrated in FIG. 16, data copying between backup volumes 205a will be described. It is assumed in the specific example illustrated in FIG. 16 that a clone volume CV0 is a volume already backed up to the storage apparatus 202 (a second clone volume). It is further assumed that a clone volume CV2 is a volume on which backup is performed (a first clone volume). It is further assumed that a backup volume RV0 is a backup volume of the clone volume CV0, and a backup volume RV2 is a backup volume of the clone volume CV2.

A common data copy instruction including a content of a common data table 105d for the clone volumes CV0 and CV2 is transmitted to the remote site 2. At the remote site 2, the common data copy unit 203a stores the content of the common data table included in the common data copy instruction into a common data table 204a.

Figure 16:
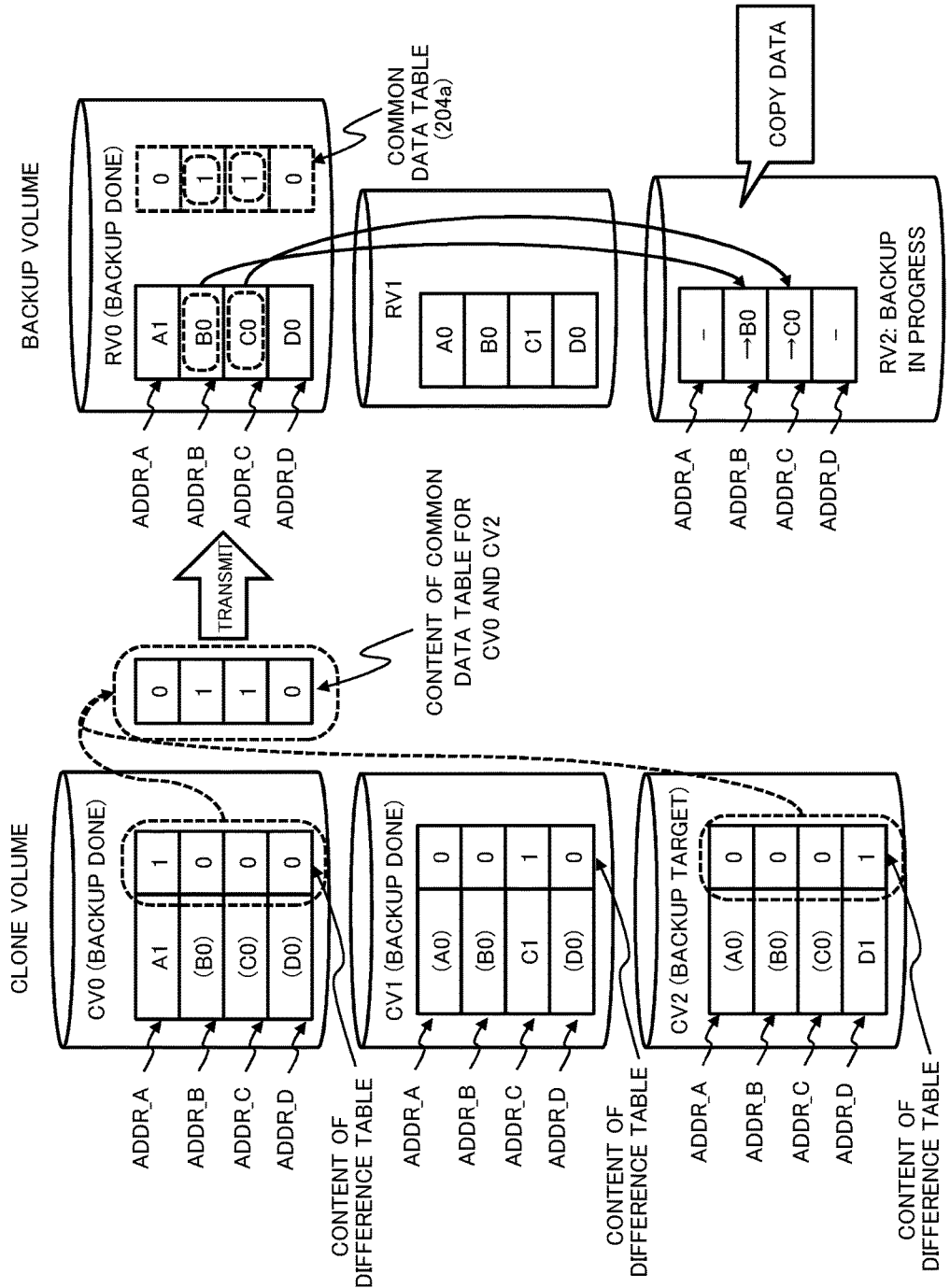
FIG. 16 is a diagram schematically illustrating processing related to data copying in the backup destination storage apparatus according to the first example embodiment.

As exemplified in FIG. 16, in the common data table 204a, each of pages ADDR_B and ADDR_C is set with "1" as a flag. Consequently, the common data copy unit 203a copies data in a page set with "1" as a flag in the common data table 204a from the backup volume RV0 to the backup volume RV2. Specifically, the common data copy unit 203a copies data stored in the page ADDR_B in the backup volume RV0 to the page ADDR_B in the backup volume RV2. Further, the common data copy unit 203a copies data stored in the page ADDR_C in the backup volume RV0 to the page ADDR_C in the backup volume RV2.

By the processing, at the remote site 2 (storage apparatus 202), data are copied from the backup volume (RV0) of the second clone volume to the backup volume (RV2) of the first clone volume. Consequently, there is no need to transfer data recorded in the pages ADDR_B and ADDR_C in the clone volume CV2 from the storage apparatus 102 to the storage apparatus 202.

Figure 17:
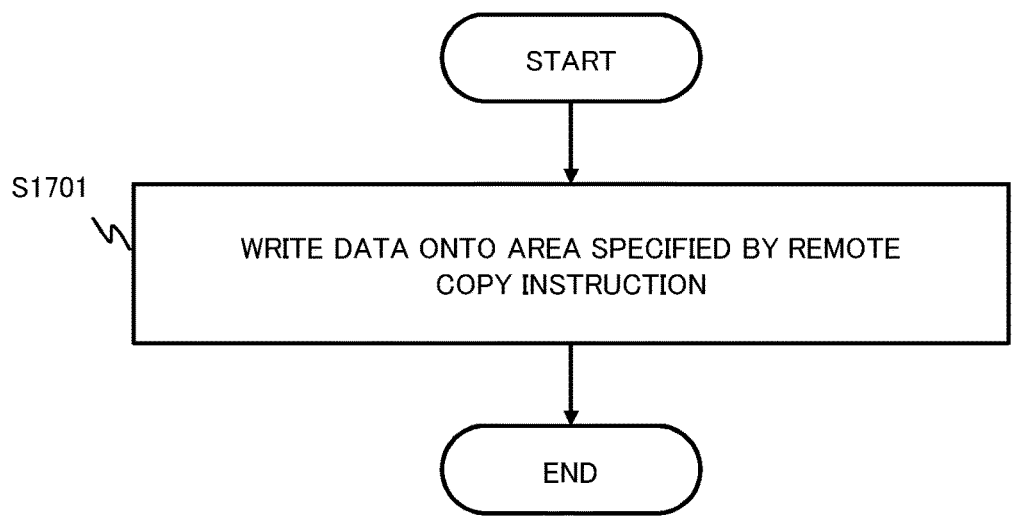
FIG. 17 is a flowchart (part 3) illustrating an operation of the backup destination storage apparatus according to the first example embodiment.

Referring to FIG. 17, remote data copy processing will be described below.

The remote data copy unit 203b reads data included in a remote copy instruction. The remote data copy unit 203b writes the read data onto a specific area in a backup volume 205a specified by the instruction (Step S1701).

Using the specific example illustrated in FIG. 12 again, the remote data copy processing will be described. In the case of the specific example in FIG. 12, areas identified by ADDR_A and ADDR_D in the clone volume CV2 are copied to a backup volume RV2 by a remote copy instruction.

By configuring the storage apparatus 102 and the storage apparatus 202 as described above, it is unnecessary to transfer data common to a first clone volume and a second clone volume from the primary site 1 to the remote site 2. The reason is that the storage apparatus 202 at the remote site 2 is able to copy common data to a backup volume from another backup volume that is already backed up. Therefore, an amount of data transferred from the primary site 1 to the remote site 2 is reduced. Accordingly, influence of communication delay and delay in a backup time on an operation are reduced.

Figure 18:
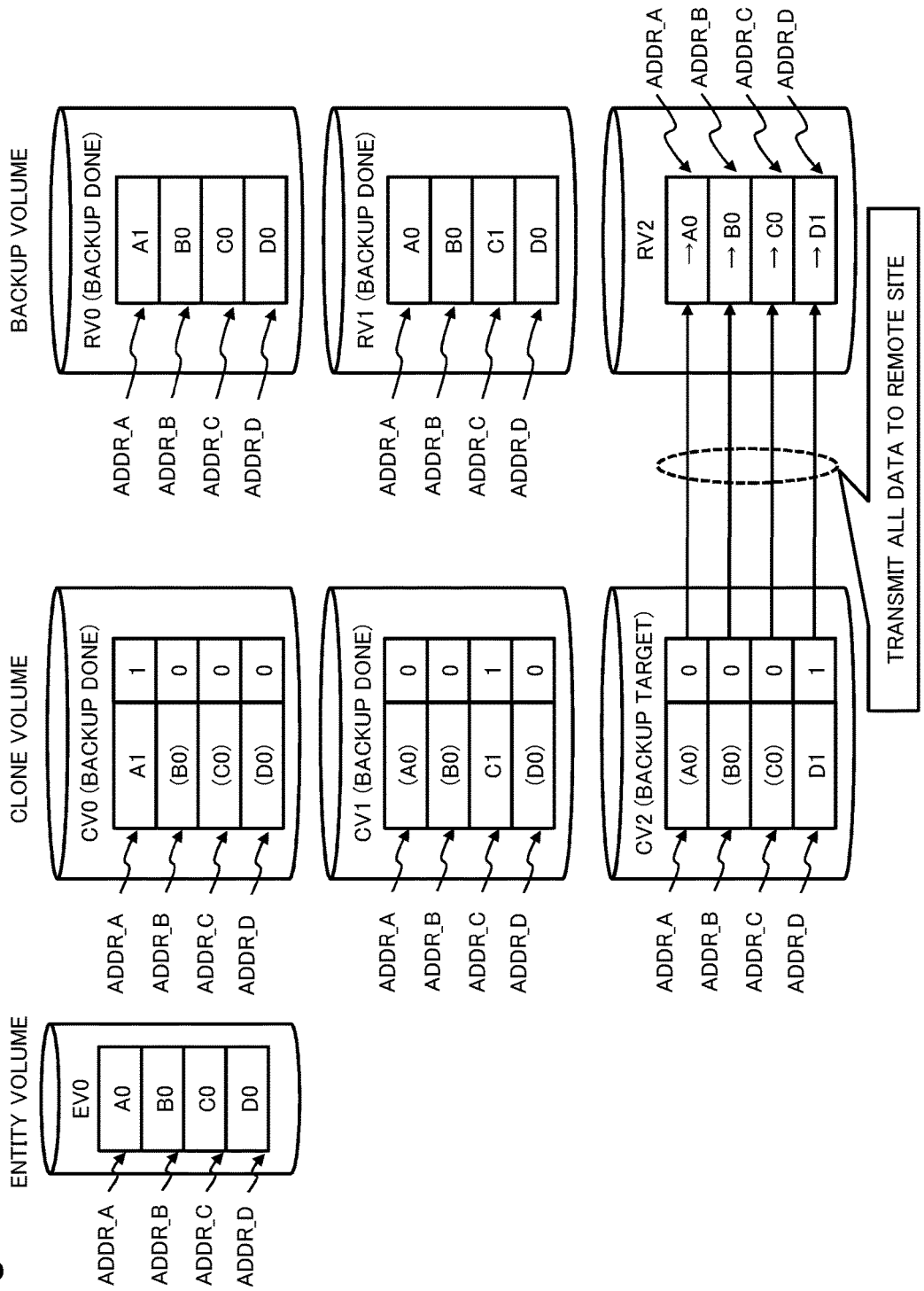
FIG. 18 is a diagram schematically illustrating an operation when a method of transferring an entire volume as is to a remote site is employed, as a comparison with a technology according to the present disclosure.

FIG. 18 is a diagram schematically illustrating a backup process when a method of backing up an entire clone volume as is to the remote site 2 is used, as a comparison with the technology according to the present disclosure.

Backups of clone volumes CV0, CV1, and CV2 are generated in backup volumes RV0, RV1, and RV2, respectively. When entire clone volumes are backed up as is to the remote site 2, all data in the respective clone volumes are transmitted to the remote site 2. Consequently, a large amount of data is transferred.

In the example in FIG. 18, when the clone volume CV2 is backed up, all data stored in areas identified by ADDR_A, ADDR_B, ADDR_C, and ADDR_D are transferred to the remote site 2. In the example in FIG. 18, data common to the clone volumes CV0 and CV2 (ADDR_B and ADDR_C) are already stored in the backup volume RV0 at the remote site 2. However, the data are not used in generation of the backup volume RV2 when backing up the clone volume CV2.

By contrast, in the technology according to the present disclosure described by using the example embodiment, for example, as illustrated in the specific examples in FIGS. 10, 12, and 16, data common to the clone volume CV0 and the clone volume CV2 are copied at the remote site 2 (FIG. 16). In other words, by transferring an area not copied at the remote site from the primary site 1 to the remote site 2, an amount of transferred data can be reduced. In the case of the present example embodiment described above, a content of a common data table 105d is transferred from the primary site 1 to the remote site 2 by a common data copy instruction. For example, the content of the common data table 105d may be expressed as a bitmap (a bitmap set with "1" or "0" as a flag) for each area (for example, each page) in a clone volume. Since a data amount of the common data table 105d is smaller, compared with a data amount of the entire clone volume, an amount of data transferred from the primary site 1 to the remote site 2 is reduced.

Figure 19:
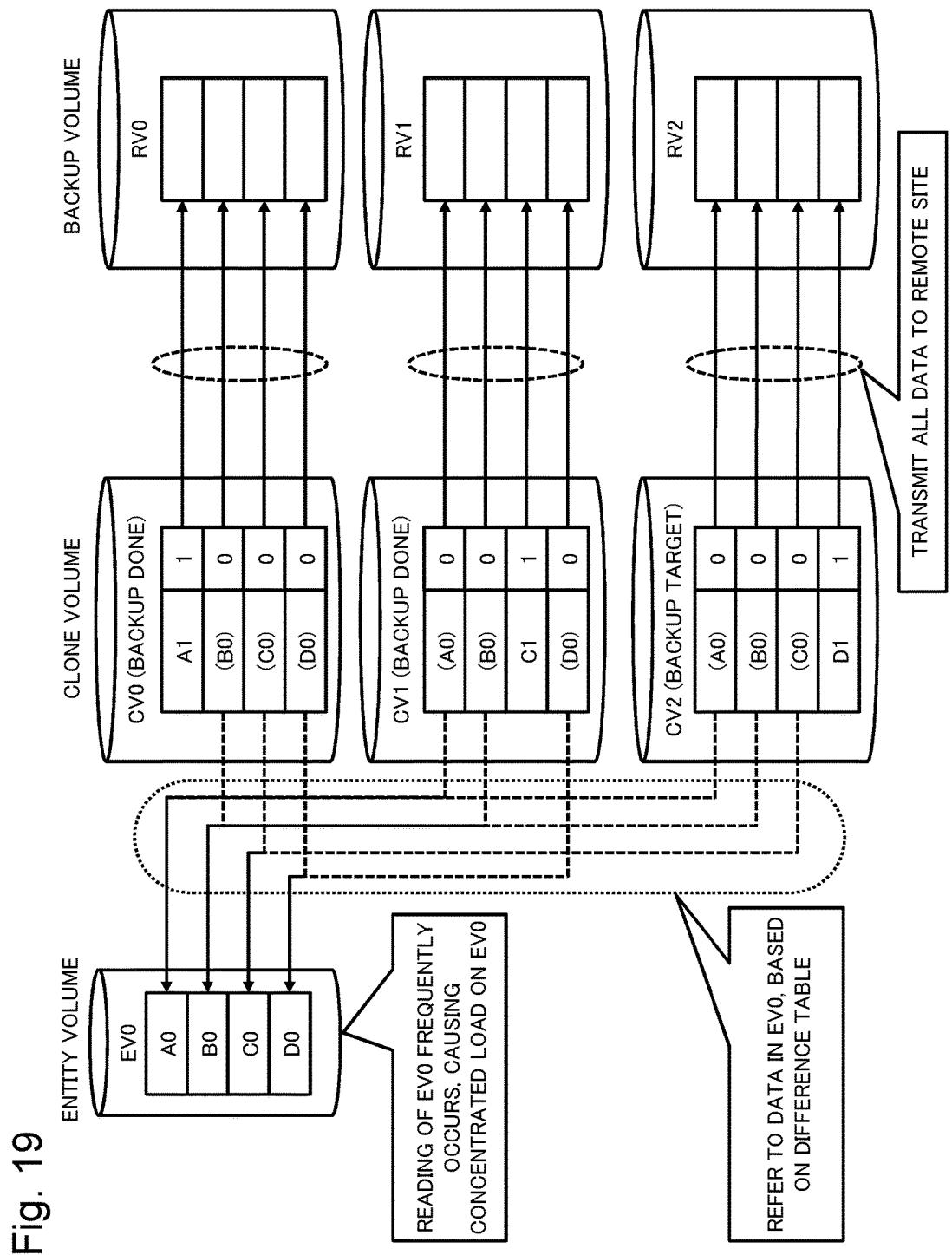
FIG. 19 is a diagram schematically illustrating an operation when a plurality of clone volumes are backed up to a remote site by using the method of transferring an entire volume as is to a remote site, as a comparison with the technology according to the present disclosure.

FIG. 19 is a diagram schematically illustrating an operation when a plurality of clone volumes are backed up to the remote site 2 by using a method of backing up an entire clone volume as is to the remote site 2. When a clone volume is backed up, data in an entity volume EV0 are referred to with respect to an area without a difference from the entity volume EV0 (an area set with a flag "0" in a difference table 105b). In the example in FIG. 19, for example, when clone volumes CV1 and CV2 are backed up, an area in the entity volume EV0 is referred to multiple times. Thus, when the method of backing up an entire clone volume as is to the remote site 2 is used, concentrated access to the entity volume EV0 is generated. Consequently, a processing load of the entity volume EV0 may increase.

Figure 20:
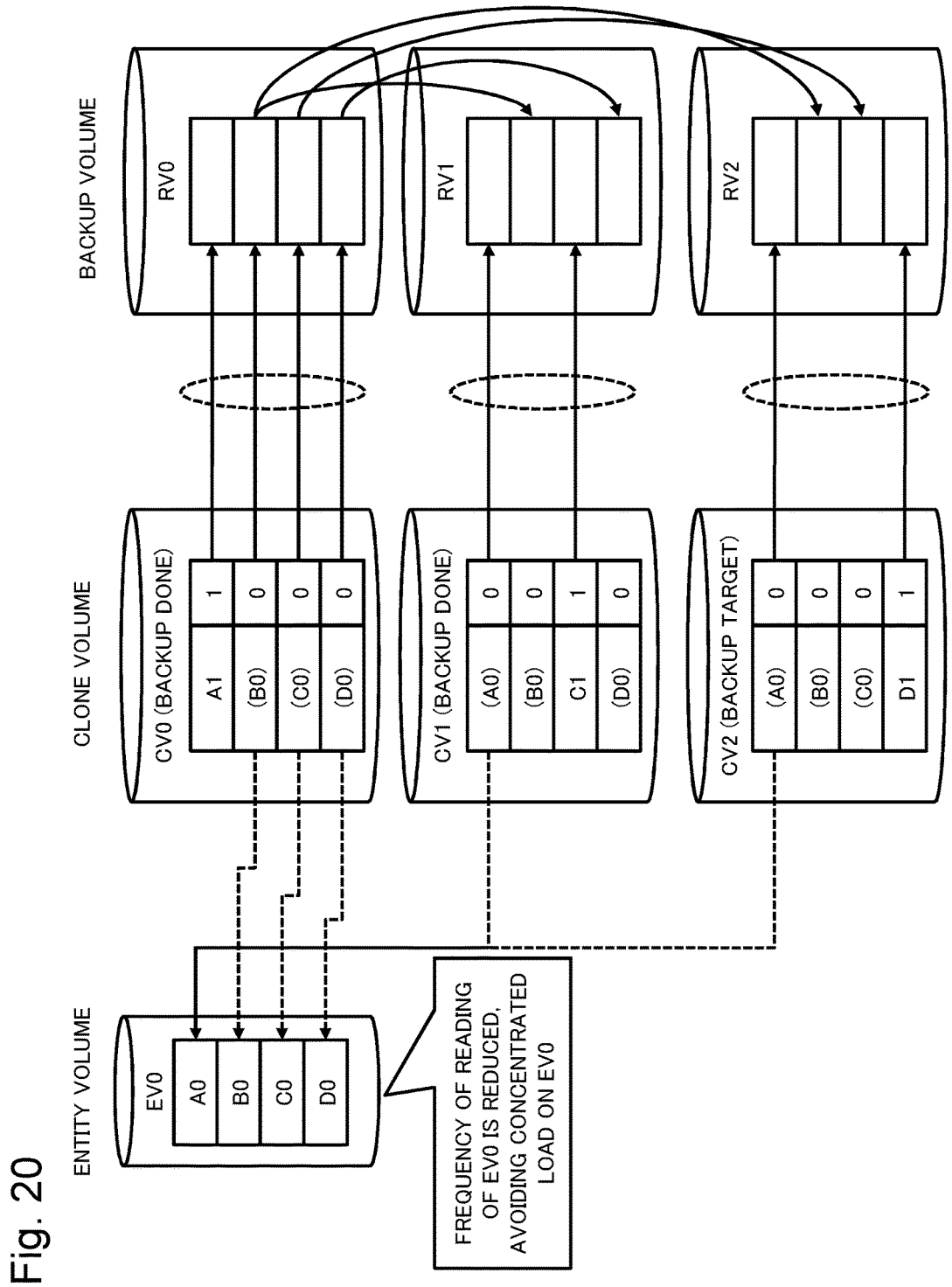
FIG. 20 is a diagram schematically illustrating an operation when a plurality of volumes are backed up to a remote site 2 by using the storage apparatuses according to the first example embodiment.

On the other hand, FIG. 20 is a diagram schematically illustrating an operation when a plurality of clone volumes are backed up to the remote site 2 by using the present example embodiment. In the example in FIG. 20, data common to the clone volumes CV0 and CV1 are copied from the backup volume RV0 to the backup volume RV1. Data common to the clone volumes CV0 and CV2 are copied from the backup volume RV0 to the backup volume RV2. That is to say, when each clone volume (CV1 and CV2) is backed up, there is no need to refer to the entity volume EV0 in terms of the data. Consequently, the present example embodiment is able to reduce access to the entity volume EV0.

The following modified example (variation) of the present example embodiment described above may be considered. The modified example of the present example embodiment described below may be referred to as a first modified example.

A functional configuration capable of providing the first modified example may be similar to the configuration of the first example embodiment (FIG. 2). Functions (processing) of some of components according to the first modified example are expanded from the first example embodiment.

A common data table generation unit 103a in a backup controller 103 according to the first modified example refers to a volume management table 105a. Out of clone volumes that are derived from a same derivation source entity volume as a clone volume to be backed up (first clone volume) and are different from the first clone volume, the common data table generation unit 103a identifies a plurality of clone volumes (second clone volumes) that are being backed up or already backed up. For example, the common data table generation unit 103a may identify all second clone volumes, one by one, with respect to a certain first clone volume.

The common data table generation unit 103a generates a common data table 105d indicating an area (address) storing data identical to data stored in the first clone volume (common data) for each identified second clone volume.

A common data copy instruction unit 103b transmits a common data copy instruction to a storage apparatus 202 at a remote site 2 for each common data table 105d generated by the common data table generation unit 103a. In this case, the common data copy instruction unit 103b may transmit a separate common data copy instruction for each common data table 105d or may include contents of one or more common data tables 105d in one common data copy instruction.

Figure 21:
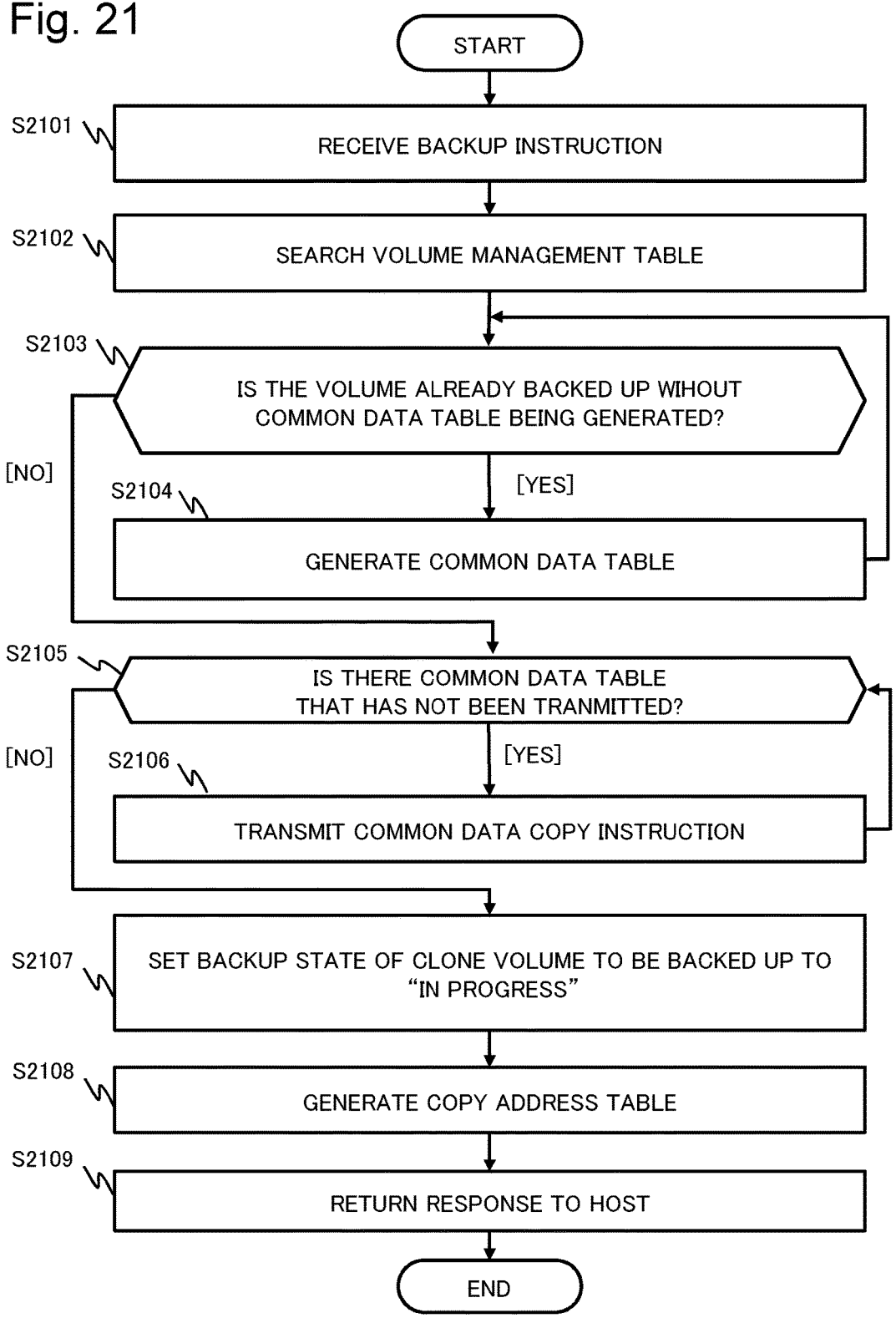
FIG. 21 is a flowchart illustrating an operation of a storage apparatus according to a modified example of the first example embodiment.

Referring to a flowchart exemplified in FIG. 21, remote backup instruction processing according to the first modified example will be described below.

The backup controller 103 in a storage apparatus 102 receives a remote backup instruction from a host 101 (Step S2101).

The common data table generation unit 103a refers to a volume management table 105a and identifies a second clone volume related to a clone volume 106b (first clone volume) designated by the remote backup instruction (Step S2102). When a plurality of second clone volumes exist, the common data table generation unit 103a may identify all the second clone volumes.

As described above, the second clone volume is another clone volume 106b derived from an entity volume 106a being a same derivation source as that of the first clone volume. The second clone volume is already backed up to the remote site 2, or backup processing thereof is in progress.

The common data table generation unit 103a checks whether there is a second clone volume for which a common data table 105d with respect to the first clone volume is not generated (Step S2103). When there is the second clone volume for which the common data table 105d is not generated ([YES] in Step S2103), the common data table generation unit 103a selects such a second clone volume.

The common data table generation unit 103a generates a common data table 105d for the selected second clone volume and the first clone volume (Step S2104)

For example, the common data table generation unit 103a is able to generate a common data table 105d, based on a difference table 105b related to a certain second clone volume, a difference table 105b related to the first clone volume, and a common data table 105d that is already generated.

For example, the common data table generation unit 103a calculates a logical disjunction (OR) of a difference table 105b related to a certain second clone volume, a difference table 105b related to the first clone volume, and another common data table 105d that is already generated. For example, the common data table generation unit 103a may calculate a logical disjunction of flag values ("1" or "0") set to respective areas (for example, pages) in a volume, the areas being set in each table. The common data table generation unit 103a generates a common data table 105d by setting an area (page) with a flag value being "0" as a result of such calculation, as a common data area.

For example, the common data table generation unit 103a may repeatedly perform Steps S2103 and S2104 until a common data table 105d is generated for every second clone volume.

Figure 22:
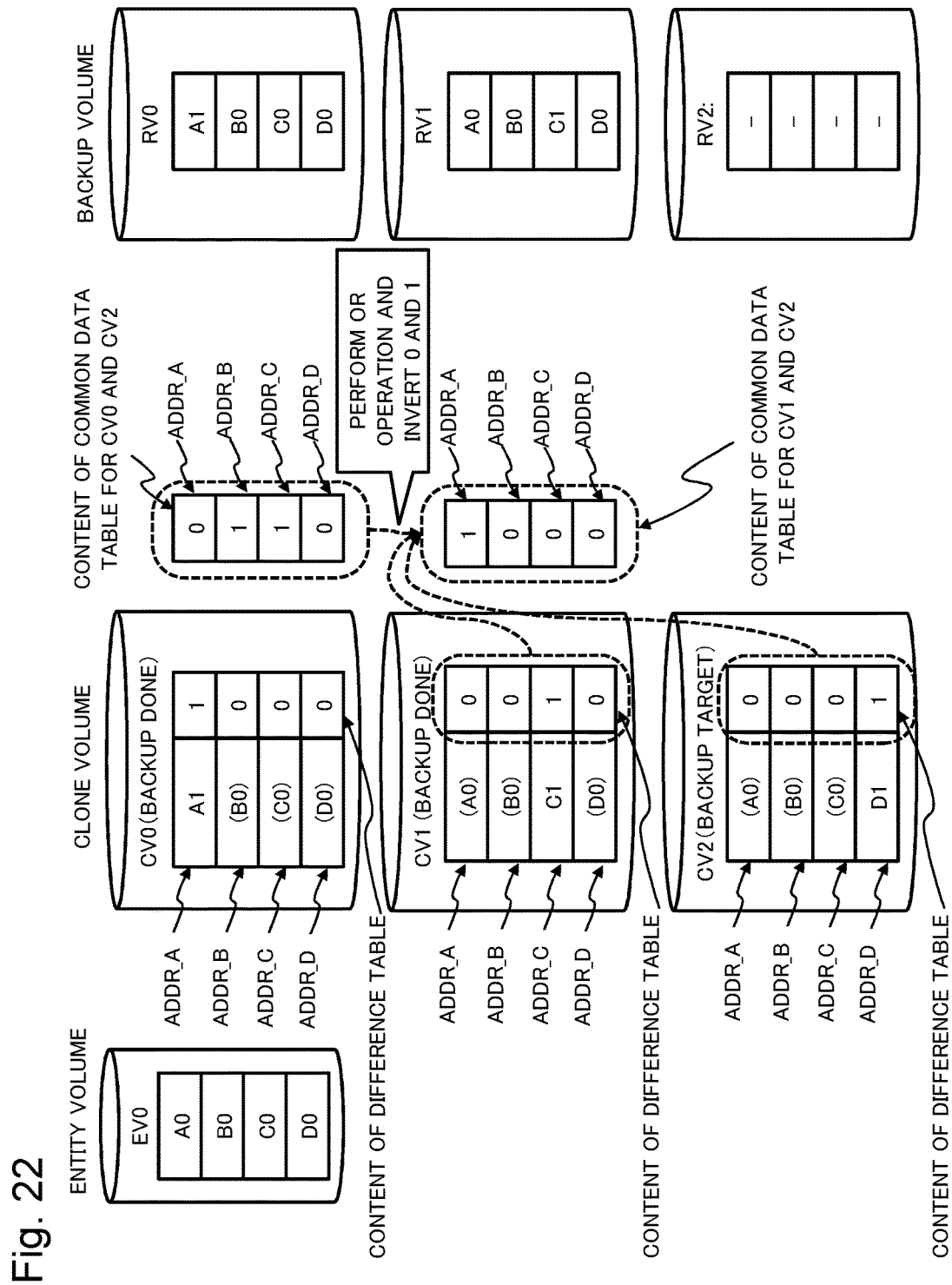
FIG. 22 is a diagram (part 1) schematically illustrating processing related to data copying according to the modified example of the first example embodiment.

Using a specific example illustrated in FIG. 22, a generation procedure of a common data table 105d will be described. In the case of the example in FIG. 22, it is assumed that clone volumes CV0, CV1, and CV2 are derived from a common entity volume EV0. It is assumed that backup of the clone volumes CV0 and CV1 to the remote site 2 is already completed and backup processing on the clone volume CV2 is to be performed. Specifically, the clone volume CV2 is a first clone volume, and the clone volumes CV0 and CV1 are second clone volumes related to the clone volume CV2. It is further assumed that a common data table 105d for the clone volumes CV0 and CV2 is already generated.

The common data table generation unit 103a selects the clone volume CV1 and generates a common data table 105d for the clone volume CV1 and the clone volume CV2. The common data table generation unit 103a calculates a logical disjunction (OR) of flag values set to respective areas (pages) with respect to a difference table 105b of the clone volume CV2, a difference table 105b of the clone volume CV1, and the common data table 105d for CV2 and CV0.

The common data table generation unit 103a generates a common data table 105d for the clone volumes CV1 and CV2 by setting an area with a flag value being "0" in the calculation result as a common data area. At this time, the common data table generation unit 103a may generate a common data table 105d for the clone volumes CV1 and CV2 by inverting the flag values (inverting "0" to "1", and inverting "1" to "0") in the calculation result.

The common data copy instruction unit 103b checks whether there is a common data table 105d not transmitted to the remote site 2 (Step S2105).

When a common data table 105d not transmitted to the remote site 2 exists ([YES] in Step S2105), the common data copy instruction unit 103b transmits a common data copy instruction including a content of the common data table 105d to the storage apparatus 202 at the remote site 2 (Step S2106). The common data copy instruction may include the common data table 105d and information (for example, volume number) by which a backup volume storing common data can be identified.

The common data copy instruction unit 103b sets a backup state 504 of the first clone volume in the volume management table 105a to a value indicating "IN PROGRESS" (Step S2107).

By the transmission of the common data copy instruction, processing of copying common data from a backup volume 205a of the second clone volume to a backup volume 205a of the first clone volume is separately performed in the storage apparatus 202. For example, in the case of the specific example illustrated in FIG. 22, areas identified by ADDR_B and ADDR_C in a backup volume RV0 are copied to the same areas in a backup volume RV2. Similarly, an area identified by ADDR_A in a backup volume RV1 is copied to the same area in the backup volume RV2.

A copy address determination unit 103c generates a copy address table related to the first clone volume (Step S2108). For example, the copy address determination unit 103c calculates a logical disjunction (OR) of flag values for each area in common data tables 105d related to respective second clone volumes and the first clone volume.

The copy address determination unit 103c generates a copy address table 105c by determining an area with a calculated flag value being "0" as a result of such calculation to be an area including copy target data. As an example, the copy address determination unit 103c may invert a calculated flag value.

Figure 23:
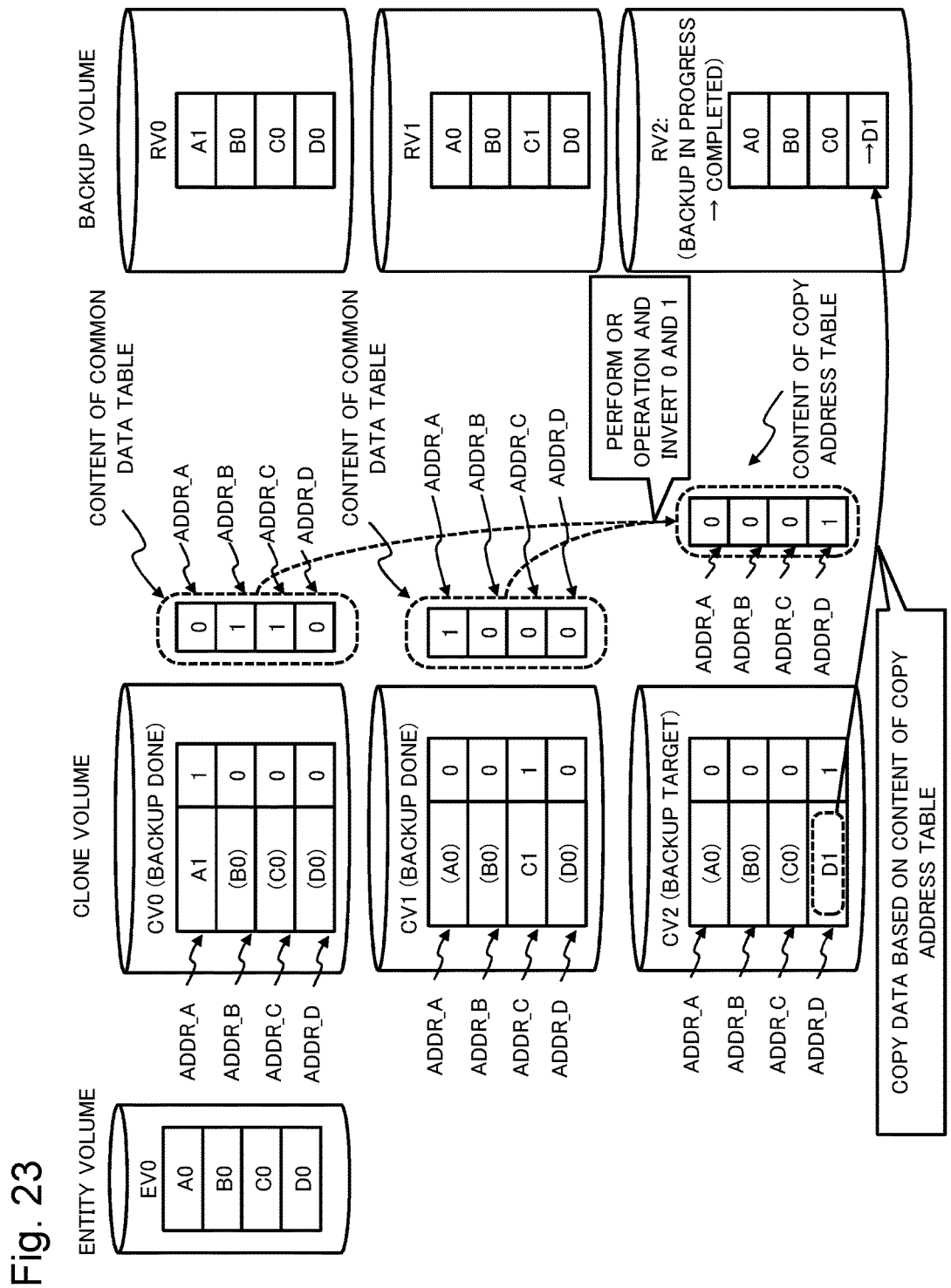
FIG. 23 is a diagram (part 2) schematically illustrating processing related to data copying according to the modified example of the first example embodiment.

Using a specific example illustrated in FIG. 23, a generation procedure of a copy address table 105c will be described. Similarly to FIG. 22, it is assumed in the example in FIG. 23 that clone volumes CV0, CV1, and CV2 are derived from a common entity volume EV0. It is assumed that backup of the clone volumes CV0 and CV1 to the remote site 2 is already completed, and backup processing on the clone volume CV2 is to be performed. It is further assumed that common data tables 105d for the clone volumes CV0, CV1, and CV2 are already generated.

The copy address determination unit 103c calculates a logical disjunction (OR) of flag values for each area in the common data table 105d for the clone volumes CV0 and CV2, and the common data table 105d for the clone volumes CV0 and CV1. The copy address determination unit 103c identifies an area with a calculated flag value being "0" as an area including copy target data and generates a copy address table 105c. In the case of the example in FIG. 23, a flag of each of areas identified by ADDR_A, ADDR_B, and ADDR_C as a result of the calculation is "1," and a flag of an area identified by ADDR_D is "0." The copy address determination unit 103c may generate a copy address table 105c by inverting a calculated flag value. Consequently, in the case of the example in FIG. 23, the flag of each of the areas identified by ADDR_A, ADDR_B, and ADDR_C in the copy address table 105c is set to a value "0," and the flag of the area identified by ADDR_D is set to a value "1."

The backup controller 103 transmits a response to the host 101 (Step S2109).

According to the first example embodiment described above, common data are copied from a backup volume of a certain second clone volume to a backup volume of a first clone volume. By contrast, in the case of the first modified example configured as described above, for example, common data are copied from backup volumes of a plurality of second clone volumes to a backup volume of the first clone volume. That is to say, compared with the first example embodiment, the first modified example is able to increase backup volumes as copy sources from which common data are copied. Consequently, the first modified example is able to further reduce traffic required for backup data transfer and is able to further reduce a load due to access to the entity volume 106a.

Figure 24:
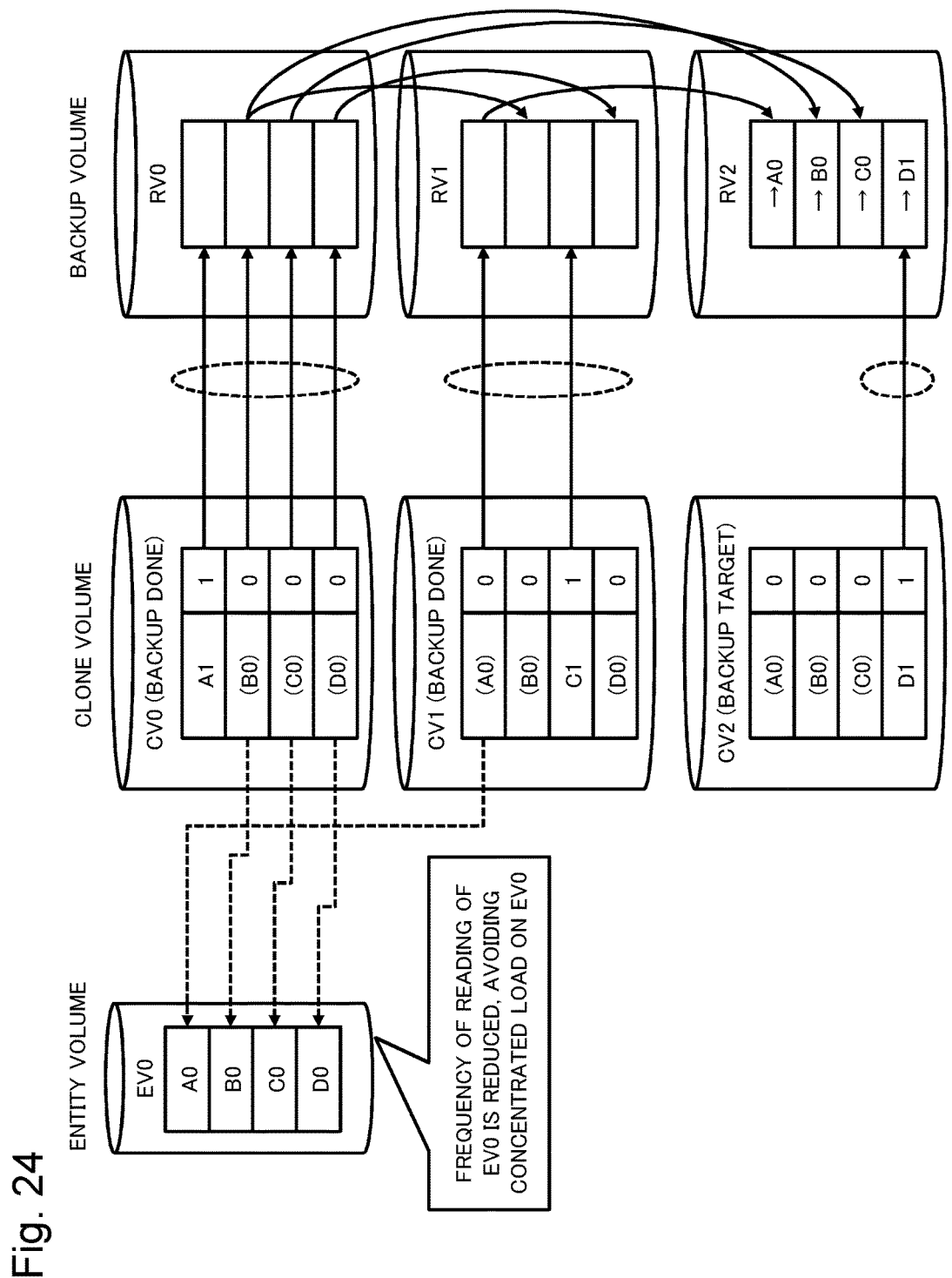
FIG. 24 is a diagram schematically illustrating an operation when a plurality of volumes are backed up to the remote site 2 by using the storage apparatuses according to the modified example of the first example embodiment.

FIG. 24 is a diagram schematically illustrating an operation when a plurality of clone volumes are backed up to the remote site 2 by using the first modified example. In the example in FIG. 24, data common to clone volumes CV0 and CV1 are copied from a backup volume RV0 to a backup volume RV1. Data common to the clone volumes CV0 and CV2 are copied from the backup volume RV0 to a backup volume RV2. Data common to the clone volumes CV1 and CV2 are copied from the backup volume RV1 to the backup volume RV2. Consequently, compared with the specific example (first example embodiment) illustrated in FIG. 20, data copied from the clone volume CV2 to the backup volume RV2 (i.e. data transferred from a primary site 1 to the remote site 2) are further reduced. Further, reference to the entity volume EV0 at the primary site 1 is reduced.

Second Example Embodiment

A second example embodiment being an underlying example embodiment of the first example embodiment and the modified example thereof that are described above will be described.

Figure 25:
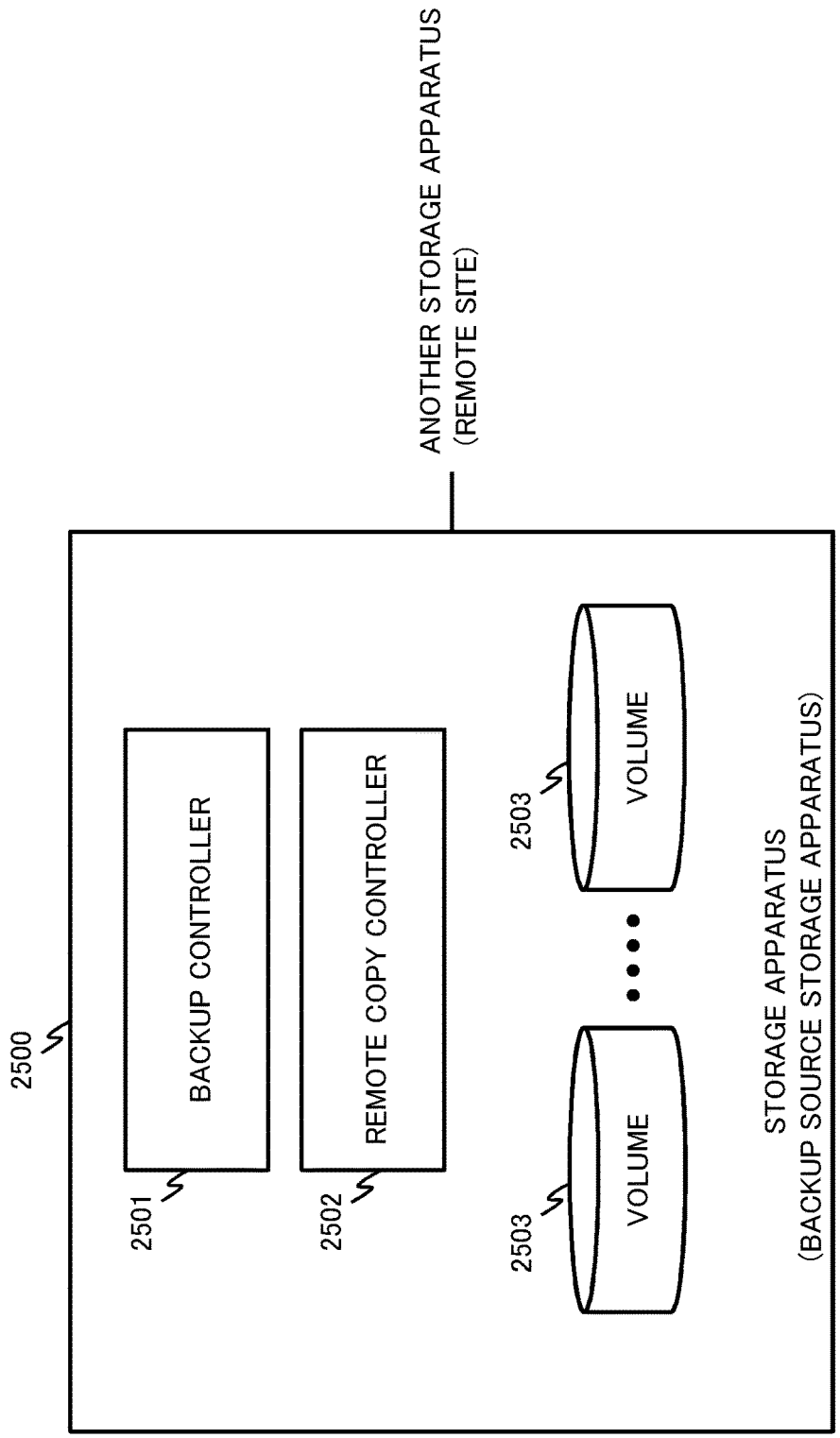
FIG. 25 is a block diagram exemplifying a functional configuration of a storage apparatus according to a second example embodiment.

FIG. 25 is a block diagram exemplifying a functional configuration of a storage apparatus 2500 according to the present example embodiment. For example, the storage apparatus 2500 according to the present example embodiment is a storage apparatus storing backup target data (a backup source storage apparatus).

The storage apparatus 2500 may be communicably connected by a suitable communication method to a remote site including another storage apparatus storing backup data. For example, the storage apparatus 2500 and the other storage apparatus at the remote site may be included in a same information processing system or may be included in different information processing systems.

The storage apparatus 2500 is configured to include a backup controller 2501, a remote copy controller 2502, and one or more volumes 2503. The components constituting the storage apparatus 2500 may be communicably connected to one another by a suitable communication method.

The backup controller 2501 is configured to provide processing (operation) as described below. Specifically, the backup controller 2501 identifies a common data area being an area storing data common to a first volume including a storage area capable of storing data and one or more second volumes including storage areas capable of storing data. For example, the first volume and the second volume may be configured similarly to the clone volume 106b according to the first example embodiment.

The backup controller 2501 transmits an instruction related to backup of the first volume to the remote site configured to store backup data of the second volume and the first volume. For example, such an instruction may include information by which a common data area can be identified and may be an instruction indicating copying, at the remote site, data stored in the common data area from the backup data of the second volume to the backup data of the first volume.

For example, the backup controller 2501 may be provided as the backup controller 103 and the first configuration storage unit 105, according to the respective example embodiment and modified example.

The remote copy controller 2502 is configured to provide processing (operation) as described below. Specifically, the remote copy controller 2502 identifies an area different from a common data area in a first volume and transmits data stored in the identified area to the remote site.

For example, the remote copy controller 2502 may be provided as the remote copy controller 104 and the first configuration storage unit 105, according to the respective example embodiment and modified example.

The volume 2503 is a storage unit including a storage area capable of storing data. The volume 2503 may be provided by a physical or virtual storage device. The first volume and second volume may be provided by the volumes 2503. For example, the volume 2503 may be provided as the volume 106 according to the respective example embodiment and modified example.

An operation of the storage apparatus 2500 according to the present example embodiment configured as described above will be described.

For example, the backup controller 2501 may start processing, triggered by an instruction to back up a certain volume 2503, or the like.

The backup controller 2501 identifies a first volume (volume 2503) being a backup target and a second volume (another volume 2503) storing same data as the first volume at least in a partial area thereof. For example, the second volume may be a volume 2503 for which backup processing to the remote site is in progress or backup processing is already completed.

The backup controller 2501 identifies a common data area being an area recording same data in the first volume and the second volume. The backup controller 2501 may identify an address of the common data area.

The backup controller 2501 transmits an instruction related to backup of the first volume to the remote site configured to store backup data of the second volume and the first volume. Such an instruction may include information by which the common data area can be identified. Such an instruction may include information by which a second volume including the common data area can be identified.

By such an instruction, at the remote site, data stored in the common data area are copied from the backup data of the second volume to the backup data of the first volume. Accordingly, the storage apparatus 2500 does not need to transfer data stored in the common data area to the remote site.

The remote copy controller 2502 identifies an area different from the common data area in the first volume. Then, the remote copy controller 2502 transmits data stored in the identified area to the remote site. The transmitted data are written onto the backup data of the first volume at the remote site. Consequently, data stored in the area different from the common data area are transferred from the storage apparatus 2500 to the remote site.

The storage apparatus 2500 according to the second example embodiment configured as described above is able to reduce traffic when backing up the first volume to the remote site. The reason is that the storage apparatus 2500 instructs the remote site to copy data common to the first volume and the second volume at the remote site. Further, the storage apparatus 2500 transmits data included in an area other than the common data area in the first volume to the remote site. In other words, when backing up the first volume, the storage apparatus 2500 according to the present example embodiment does not need to transfer data included in the common data area between the first volume and the second volume to the remote site. Thus, an amount of data transferred to the remote site is reduced.

Figure 26:
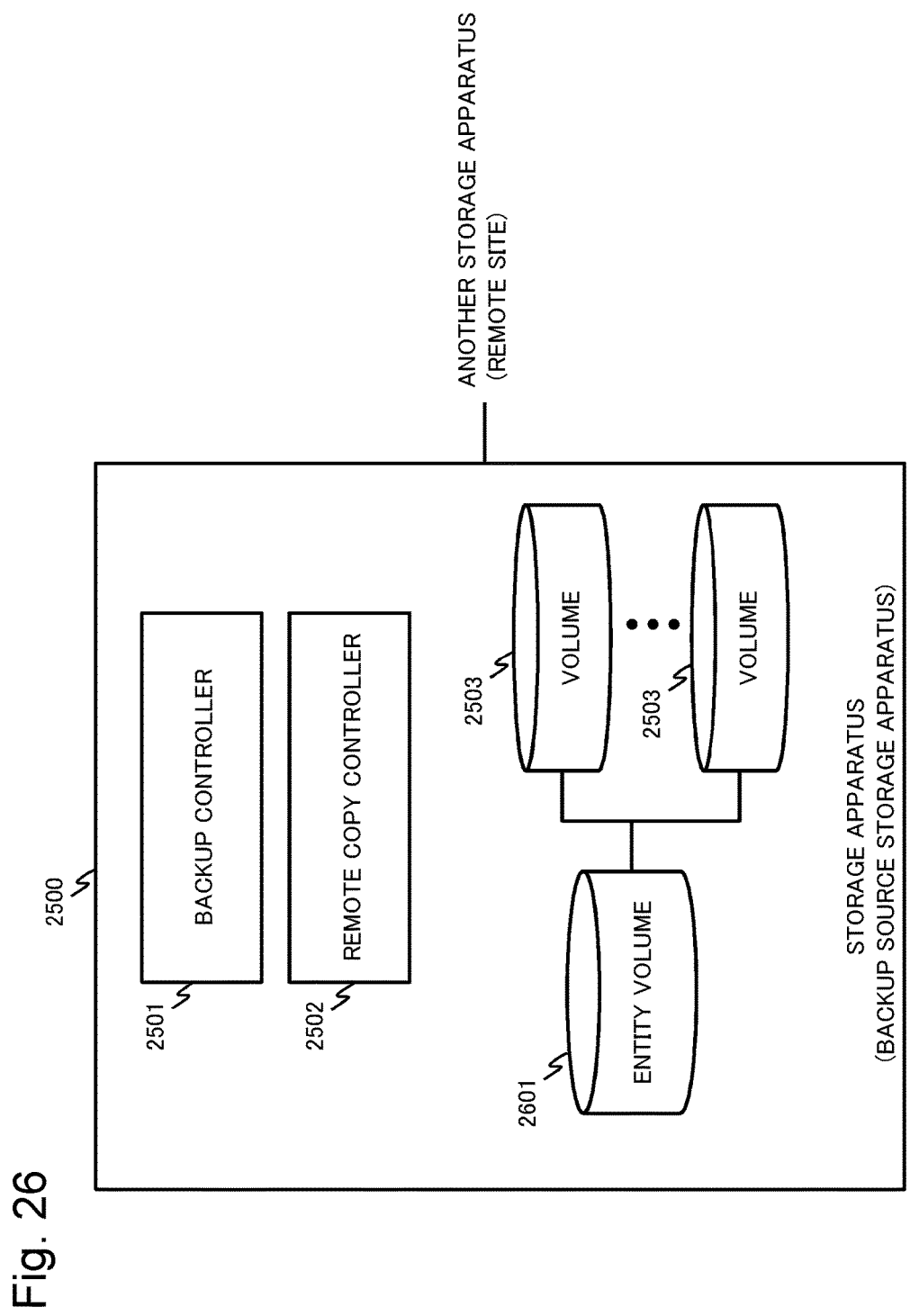
FIG. 26 is a block diagram exemplifying a functional configuration of a storage apparatus according to a modified example of the second example embodiment.

Referring to FIG. 26, a modified example (variation) of the second example embodiment described above will be described below. In FIG. 26, a volume 2503 is a clone volume in the linked clone method and is derived from a certain common entity volume 2601.

A backup controller 2501 identifies a volume 2503 derived from an entity volume 2601 being a same derivation source as that of another volume 2503 (first volume) being a backup target, as a second volume.

The backup controller 2501 may identify a common data area between the first volume and the second volume from a difference between the first volume and the entity volume, and a difference between the second volume and the entity volume. For example, the difference between the first volume and the entity volume, and the difference between the second volume and the entity volume may be expressed in a form of a difference table (105*b*) similarly to the first example embodiment. The common data area may be expressed in a form of a common data table (105*d*) similarly to the first example embodiment.

For example, a remote copy controller 2502 may identify an area different from the common data area identified above as an area to be copied to a remote site (remote copy area). The remote copy area may be expressed in a form of a copy address table (105*c*) similarly to the first example embodiment.

The modified example exemplified in FIG. 26 is able to reduce an amount of data transferred to the remote site, similarly to the second example embodiment, when backing up a clone volume based on the linked clone method.

Further, the modified example exemplified in FIG. 26 is able to reduce a load due to access to the entity volume 2601 generated when backing up a certain first volume. The reason is that the storage apparatus 2500 does not need to transfer a common data area between the first volume and a second volume, and reference (access) to the entity volume does not occur with respect to the common data area.

Third Example Embodiment

A third example embodiment being an underlying example embodiment of the first example embodiment and the modified example thereof will be described.

Figure 27:
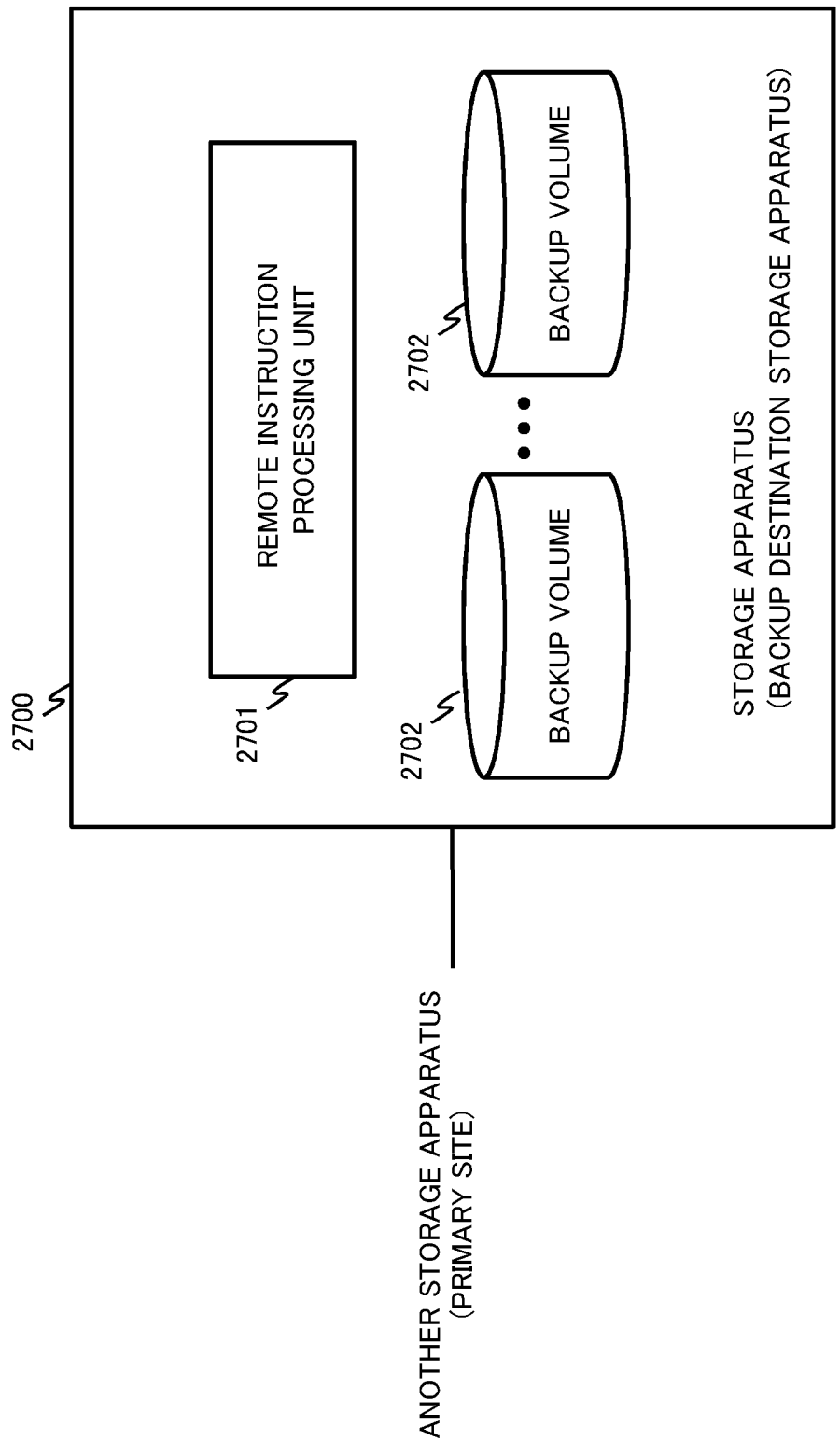
FIG. 27 is a block diagram exemplifying a functional configuration of a storage apparatus according to a third example embodiment.

FIG. 27 is a block diagram exemplifying a functional configuration of a storage apparatus 2700 according to the present example embodiment. For example, the storage apparatus 2700 according to the present example embodiment is a storage apparatus storing backup data related to a certain volume (backup destination storage apparatus).

The storage apparatus 2700 may be communicably connected by a suitable communication method to a primary site including another storage apparatus including a volume to be backed up. For example, the storage apparatus 2700 and the other storage apparatus at the primary site may be included in a same information processing system or may be included in different information processing systems. For example, the other storage apparatus at the primary site may be the storage apparatus 102 according to the first example embodiment and the modified example thereof, or may be the storage apparatus 2500 according to the second example embodiment.

The storage apparatus 2700 is configured to include a remote instruction processing unit 2701 and one or more backup volumes 2702. The components constituting the storage apparatus 2700 may be communicably connected to one another by a suitable communication method.

The backup volume 2702 stores backup data related to a volume stored in another storage apparatus.

The remote instruction processing unit 2701 is configured to provide processing (operation) as described below. Specifically, the remote instruction processing unit 2701 receives an instruction related to backup of a first volume being a storage area included in another storage apparatus. Such an instruction may include information by which a common data area being an area storing data common to a first volume and a second volume that are included in the other storage apparatus can be identified.

The second volume included in the other storage apparatus is a storage area different from the first volume and may store same data as the first volume at least in a partial storage area thereof. The first and second volumes may be configured similarly to the clone volume 106*b* according to the first example embodiment.

For example, in the storage apparatus 2700, backup data of the first volume and backup data of the second volume may be stored in different backup volumes 2702, respectively.

In response to the instruction received from the other storage apparatus, the remote instruction processing unit 2701 copies data included in the common data area from a backup volume 2702 storing backup data of the second volume to a backup volume 2702 storing backup data of the first volume.

The remote instruction processing unit 2701 receives from the other storage apparatus at least part of data stored in the first volume in the other storage apparatus (for example, data stored in an area different from the common data area in the first volume in the other storage apparatus). The remote instruction processing unit 2701 writes the received data onto the backup volume related to the first volume.

For example, the remote instruction processing unit 2701 may be provided as the remote instruction processing unit 203 and the second configuration storage unit 204, according to the first example embodiment and modified example.

The backup volume 2702 is a storage unit including a storage area capable of storing data. The backup volume 2702 may be provided by a physical or virtual storage device. The backup volume 2702 is configured to store backup data of a volume (for example, the clone volume 106*b* and the volume 2503) in the other storage apparatus.

For example, the backup volume 2702 may be provided as the backup volume 205*a* according to the first example embodiment and modified example.

An operation of the storage apparatus 2700 according to the present example embodiment configured as described above will be described.

The remote instruction processing unit 2701 receives from the other storage apparatus an instruction related to backup of a first volume stored in the other storage apparatus. As described above, the instruction may include information by which a common data area between a first volume and a second volume in the other storage apparatus can be identified.

In response to the received instruction, the remote instruction processing unit 2701 copies data stored in a common data area in a backup volume 2702 of the second volume to a backup volume 2702 of the first volume. At this time, the remote instruction processing unit 2701 may wait for completion of backup processing related to the second volume.

Consequently, data included in the common data area between the first volume and the second volume in the other storage apparatus are copied between the backup volumes 2702 in the storage apparatus 2700. That is to say, the storage apparatus 2700 does not need to receive data included in such a common data area from the other storage apparatus.

Further, the remote instruction processing unit 2701 receives data stored in an area different from the common data area, out of data stored in the first volume, from the other storage apparatus. Then, the remote instruction processing unit 2701 writes the received data onto a backup volume related to the first volume.

Processing of the remote instruction processing unit 2701 copying data stored in the common data area between the backup volumes 2702 and processing of the remote instruction processing unit 2701 writing data received from the other storage apparatus (for example, data stored in an area different from the common data area) onto the backup volume 2702 may be performed in parallel or performed sequentially.

The storage apparatus 2700 according to the present example embodiment configured as described above is able to reduce an amount of data transferred from another storage apparatus when backing up a volume stored in the other storage apparatus. The reason is that data included in a common data area between a first volume being a backup target and a second volume are copied between backup volumes 2702 in the storage apparatus 2700. More specifically, data included in the common data area are copied from a backup volume 2702 of the second volume already backed up to the storage apparatus 2700 to a backup volume 2702 of the first volume. Consequently, there is no need to transfer data included in the common data area when the first volume is backed up from the other storage apparatus to the storage apparatus 2700, and therefore traffic between the other storage apparatus and the storage apparatus 2700 can be reduced.

Hardware and Software Program (Computer Program) Configurations

A hardware configuration capable of providing the respective example embodiments will be described below.

In the description below, each of the storage apparatuses (102, 202, 2500, 2700) described in the respective example embodiments is simply and collectively referred to as a "storage apparatus." Further, each component of a storage apparatus is simply referred to as a "storage apparatus component."

The storage apparatus described in each of the example embodiments may be configured with one or more dedicated hardware apparatuses. In that case, each component illustrated in each of the diagrams may be provided in such a way to be integrated in part or in whole as hardware (circuitry in which processing logic is implemented).

For example, when the storage apparatus is provided by hardware, a component of the storage apparatus may be provided by a system on a chip (SoC) or the like on which circuitry capable of providing a function of the component is implemented. In this case, for example, data stored in a component of the storage apparatus may be stored in a random access memory (RAM) area, a read only memory (ROM) area, a flash memory area, and the like that are integrated into an SoC.

Components of the storage apparatus 102 exemplified in FIG. 2 may be implemented as a backup controller circuit performing the processing of the backup controller 103, a remote copy controller circuit providing the processing of the remote copy controller 104, a storage circuit (for example, a RAM, a ROM, and a flash memory) providing the first configuration storage unit 105 and the volume 106, and the like. Components of the storage apparatus 202 exemplified in FIG. 2 may be implemented as a remote instruction processing circuit performing the processing of the remote instruction processing unit 203, a storage circuit (for example, a RAM, a ROM, and a flash memory) providing the second configuration storage unit 204 and the backup destination volume 205, and the like. Components of the storage apparatus 2500 exemplified in FIGS. 25 and 26 may be implemented as a backup controller circuit performing the processing of the backup controller 2501, a remote copy controller circuit performing the processing of the remote copy controller 2502, a storage circuit providing the volume 2503, and the entity volume 2601, and the like. Components of the storage apparatus 2700 exemplified in FIG. 27 may be implemented as a remote instruction processing circuit performing the processing of the remote instruction processing unit 2701, a storage circuit providing the backup volume 2702, and the like. The circuitry is a specific configuration example, and various variations are assumed in implementation.

As a communication line connecting the respective components of the storage apparatus, a known communication bus or communication network may be employed. Further, the communication line connecting the respective components may connect the respective components on a peer-to-peer basis. When the storage apparatus is configured with a plurality of hardware apparatuses, the respective hardware apparatuses may be communicably connected to one another by a suitable communication method (wired, wireless, or a combination thereof).

Figure 28:
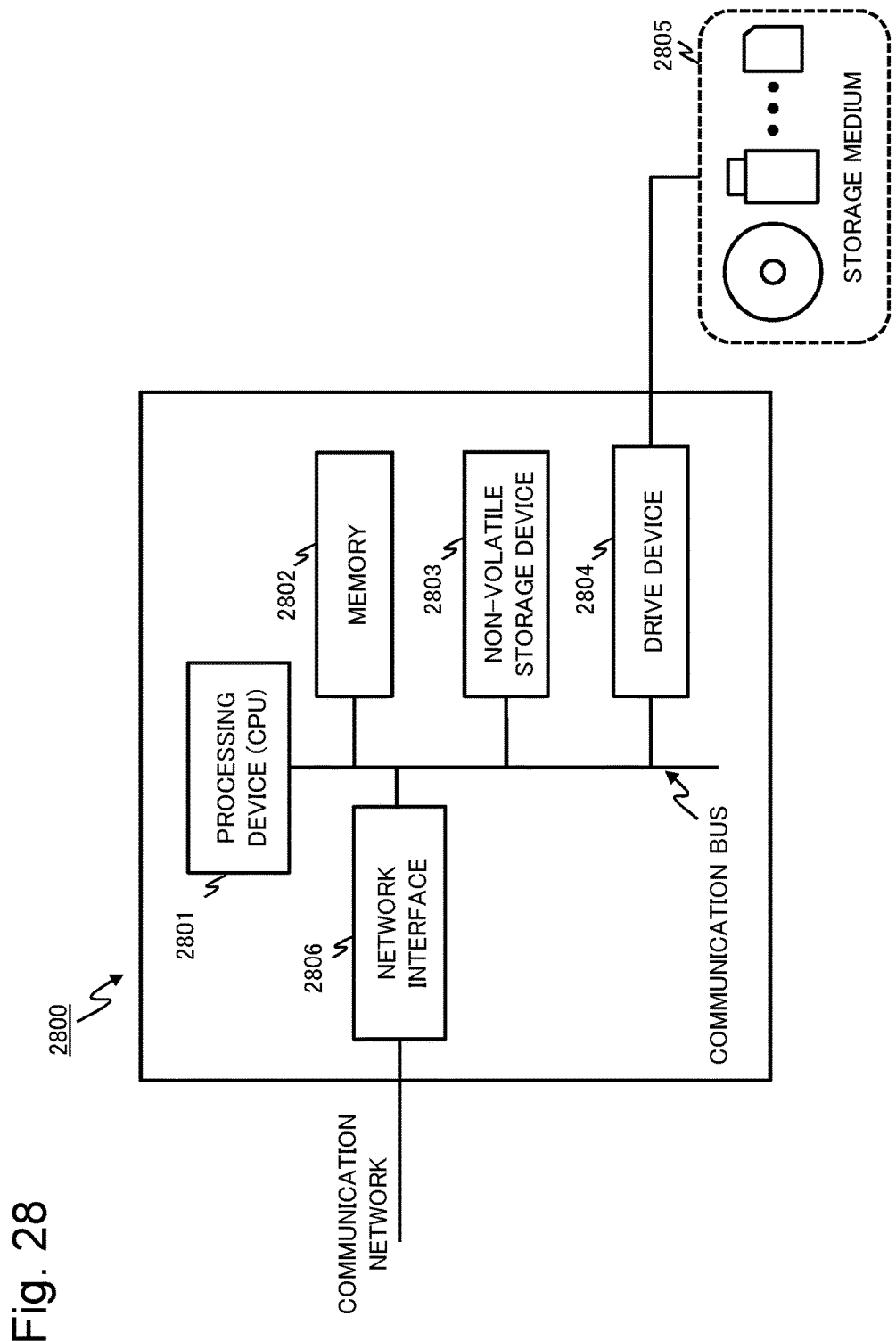
FIG. 28 is a diagram exemplifying a hardware configuration capable of providing the respective example embodiments.

The storage apparatus may be configured with a general-purpose hardware apparatus 2800 as exemplified in FIG. 28 and various types of software programs (computer programs) executed by such a hardware apparatus 2800. In this case, the storage apparatus may be configured with a suitable number of hardware apparatuses 2800 and software programs.

A processing device 2801 in FIG. 28 is a processing device such as a general-purpose central processing unit (CPU) and a microprocessor. For example, the processing device 2801 may read various types of software programs stored in a non-volatile storage device 2803, to be described later, into a memory 2802 and perform processing in accordance with such software programs.

In this case, for example, a component of the storage apparatus according to the respective example embodiments may be provided as a software program executed by the processing device 2801.

Components of the storage apparatus 102 exemplified in FIG. 2 may be implemented as a backup control program performing the processing of the backup controller 103, a remote copy control program performing the processing of the remote copy controller 104, a program related to the storage processing of the first configuration storage unit 105 and the volume 106, and the like. Components of the storage apparatus 202 exemplified in FIG. 2 may be implemented as a remote instruction processing program performing the processing of the remote instruction processing unit 203, a program related to the storage processing of the second configuration storage unit 204 and the backup destination volume 205, and the like. Components of the storage apparatus 2500 exemplified in FIGS. 25 and 26 may be implemented as a backup control program performing the processing of the backup controller 2501, a remote copy control program performing the processing of the remote copy controller 2502, a program related to the storage processing of the volume 2503 and the entity volume 2601, and the like. Components of the storage apparatus 2700 exemplified in FIG. 27 may be implemented as a remote instruction processing program performing the processing of the remote instruction processing unit 2701, a program related to the storage processing of the backup volume 2702, and the like. The program configuration is a specific configuration example, and various variations are assumed in implementation.

The memory 2802 is a memory device, such as a RAM, that can be referred to from the processing device 2801 and stores a software program, various types of data, and the like. The memory 2802 may be a volatile memory device.

The non-volatile storage device 2803 is a non-volatile storage device such as a magnetic disk drive and a semiconductor storage device based on a flash memory. The non-volatile storage device 2803 is able to store various types of software programs, data, and the like.

For example, the entity volume (106a, 2601), the clone volume 106b, the volume 2503, and the backup volume (205a, 2702), according to the respective example embodiments, may store data in the non-volatile storage device 2803.

For example, a drive device 2804 is a device processing reads and writes of data from and to a storage medium 2805 to be described later.

The storage medium 2805 is any storage medium capable of recording data such as an optical disk, a magneto-optical disk, and a semiconductor flash memory. The backup volume (205a, 2702) according to the respective example embodiments may be recorded in the storage medium 2805.

A network interface 2806 is an interface device connected to a communication network and may employ, for example, an interface device for wired and wireless local area network (LAN) connection.

For example, the respective storage apparatuses (102, 202, 2500, 2700) according to the respective example embodiments may be communicably connected to another storage apparatus or the host (101, 201) by a communication line connected through the network interface 2806.

For example, the storage apparatus described with the respective example embodiments as examples may be provided by supplying the hardware apparatus 2800 exemplified in FIG. 28 with a software program capable of providing the functions described in the respective example embodiments. More specifically, for example, the technology according to the present disclosure may be provided by the processing device 2801 executing the software program supplied to such an apparatus. In this case, an operating system, middleware such as database management software and network software, and the like, operating on such a hardware apparatus 2800, may perform part of the respective processing steps.

Each unit illustrated in the respective diagrams (for example, FIGS. 2, 3, 4, 25, 26, and 27) in the respective example embodiments may be provided as a software module being a function (processing) unit of a software program executed by the hardware. Note that allocation of each software module illustrated in the drawings is a configuration for convenience of description, and various configurations may be assumed in implementation.

For example, when the respective units are provided as software modules, the software modules may be stored in the non-volatile storage device 2803. Then, when performing each processing step, the processing device 2801 may read the software modules into the memory 2802.

Further, the software modules may be configured to transmit various types of data to one another by an appropriate method such as a shared memory and inter-process communication. Such a configuration enables the software modules to be communicably connected to one another.

Furthermore, the respective software programs may be recorded in the storage medium 2805. In this case, the respective software programs may be configured to be appropriately stored in the non-volatile storage device 2803 through the drive device 2804 in a shipment stage, an operation stage, or the like of the communication apparatus and the like.

In the case described above, a supply method of various types of software programs to the storage apparatus may employ a method of installation into the apparatus by using a suitable jig (tool), in a manufacture stage before shipment, a maintenance stage after shipment, or the like. Further, the supply method of various types of software programs may employ a currently common procedure such as a method of external downloading through a communication line such as the Internet.

Furthermore, in such a case, the technology according to the present disclosure may be viewed as being configured with codes constituting such software programs, or a computer-readable storage medium recording such codes. In this case, such a storage medium is not limited to a medium independent of the hardware apparatus 2800 and includes a storage medium storing or temporarily storing software programs transmitted and downloaded through a LAN or the Internet.

Further, the storage apparatus or a component of the storage apparatus may be configured with a virtualization environment virtualizing the hardware apparatus 2800 exemplified in FIG. 28, and various types of software programs (computer programs) executed in the virtualization environment. In this case, a component of the hardware apparatus 2800 exemplified in FIG. 28 is provided as a virtual device in the virtualization environment. Also in this case, the technology according to the present disclosure may be provided with a configuration similar to the case that the hardware apparatus 2800 exemplified in FIG. 28 is configured as a physical apparatus.

Following situations are known regarding a technical relating to the present disclosure described by using the respective example embodiments. A technology using a virtual machine for cost reduction and easy operation management has widely used.

Assuming a case where backup data (backup volume) of a virtual volume are generated at a backup destination. In this case, processing of reading data in each virtual volume and transferring the data to the backup destination is performed. When a backup source and the backup destination are connected by a communication line, traffic increases due to data in each virtual volume being transferred to the backup destination (remote site), and therefore a communication line delay and the like may be caused.

When a virtual volume generated by using the linked clone method on a virtual machine is backed up, a master volume storing data common to the respective virtual machines may be referred. Consequently, a load required for processing access to the master volume increases, and the time required for the backup may become longer.

However, PTL 1 merely discloses a technology of changing an existing virtual machine to a virtual machine based on the linked clone method. When the technology described in PTL 2 is used, a hash value and the like need to be calculated for every piece of data to be backed up, and it takes time to perform processing of checking whether or not transfer to a backup destination is completed. In addition, access to a master volume caused by such checking increases, and consequently, a load on the master volume increases.

By contrast, the technology according to the present disclosure is able to reduce an amount of data transferred from a backup source storage apparatus to a backup destination storage apparatus.

The respective example embodiments may also be described in part or in whole as the following Supplementary Notes. However, the following Supplementary Notes do not limit the present invention in any way.

(Supplementary Note 1)

A storage apparatus comprising:

a backup controller that is configured to identify a common data area in each of a first volume and a second volume, each of the volumes including a storage area capable of storing data, the common data area being an area storing data common to the first volume and the second volume, and to transmit an instruction to a backup destination storage apparatus being another storage apparatus configured to include, for each of the first volume and the second volume, a backup volume storing backup data duplicated from each of the first volume and the second volume, the instruction causing the back destination storage apparatus to copy, in the backup destination storage apparatus, data stored in the common data area, from the backup volume of the second volume to the backup volume of the first volume; and a remote copy controller that is configured to transmit data stored in an area different from the common data area in the first volume to the backup destination storage apparatus to duplicate the data to the backup volume of the first volume in the backup destination storage apparatus.

(Supplementary Note 2)

The storage apparatus according to Supplementary Note 1, wherein the first volume is a clone volume derived from an entity volume being the volume used as a master, the clone volume being the volume storing a difference from the entity volume, the second volume is the clone volume different from the first volume and derived from the entity volume same as the first volume, and the backup controller selects one of the second volumes, out of one or more of the second volumes for which backup processing to the backup destination storage apparatus is started, and identifies the common data area by specifying an area in the entity volume and an area in the first volume corresponding to each other and including no difference, and specifying an area in the entity volume and an area in the second volume corresponding to each other and including no difference.

(Supplementary Note 3)

The storage apparatus according to Supplementary Note 2, wherein the backup controller selects the second volume for which backup processing is started first, out of one or more of the second volumes for which backup processing to the backup destination storage apparatus is started, or identifies the common data area between each of one or more of the second volumes for which backup processing to the backup destination storage apparatus is started and the first volume and selects the second volume having a largest common data area with the first volume, and transmits the instruction which causes the backup destination storage apparatus to copy data stored in the common data area, from the backup volume of the second volume being selected, to the backup volume of the first volume.

(Supplementary Note 4)

The storage apparatus according to Supplementary Note 2 or Supplementary Note 3, wherein the remote copy controller, with regard to an area having a difference from the entity volume among areas different from the common data area in the first volume, transmits data stored in the area having the difference from the entity volume in the first volume to the backup destination storage apparatus, and, with regard to an area having no difference from the entity volume among areas different from the common data area in the first volume, transmits data stored in the area in the entity volume to the backup destination storage apparatus.

(Supplementary Note 5)

The storage apparatus according to Supplementary Note 1, wherein the backup controller selects a plurality of the second volumes for which backup processing to the backup destination storage apparatus is already started, and identifies the common data area between each of a plurality of the second volumes and the first volume, and the remote copy controller transmits at least part of data stored in an area different from each of the common data areas identified by the backup controller in the first volume to the backup destination storage apparatus.

(Supplementary Note 6)

A storage apparatus backup method by a storage apparatus including a volume including a storage area capable of storing data, the method comprising:

identifying a common data area in each of a first volume and a second volume, each of the volumes including a storage area capable of storing data, the common data area being an area storing data common to the first volume and the second volume;

transmitting an instruction to a backup destination storage apparatus being another storage apparatus configured to include a backup volume storing backup data duplicated from the volume, the instruction including information by which the common data area can be identified and causing the backup destination storage apparatus to copy, in the backup destination storage apparatus, data stored in the common data area, from the backup volume of the second volume to the backup volume of the first volume; and, by transmitting data stored in an area different from the common data area in the first volume to the backup destination storage apparatus, duplicating the data to the backup volume of the first volume in the backup destination storage apparatus.

(Supplementary Note 7)

A non-transitory computer-readable storage medium recording a storage apparatus control program causing a storage apparatus including a volume including a storage area capable of storing data to perform:

processing of identifying a common data area in each of a first volume and a second volume, each of the volumes including a storage area capable of storing data, the common data area being an area storing data common to the first volume and the second volume;

processing of transmitting dan instruction to a backup destination storage apparatus being another storage apparatus configured to include a backup volume storing backup data duplicated from the volume, the instruction including information by which the common data area can be identified and causing the backup destination storage apparatus to copy, in the backup destination storage apparatus, data stored in the common data area, from the backup volume of the second volume to the backup volume of the first volume; and processing of, by transmitting data stored in an area different from the common data area in the first volume to the backup destination storage apparatus, duplicating the data to the backup volume of the first volume in the backup destination storage apparatus.

(Supplementary Note 8)

A storage apparatus including:

one or more backup volumes each of the volumes being a volume including a storage area capable of storing data; and a remote instruction processing unit performing
processing of
receiving an instruction related to backup of a first volume, from a backup source storage apparatus being another storage apparatus, the instruction at least including information by which a common data area can be identified, the common data area being an area storing data common to the first volume and a second volume, each of the volumes being included in the backup source storage apparatus and including a storage area capable of storing data, and,
in response to the instruction, copying data included in the common data area identified by the instruction, from the backup volume of the second volume in the storage apparatus itself to the backup volume of the first volume; and processing of
receiving at least part of data included in an area different from the common data area in the first volume from the backup source storage apparatus, and
writing the received data onto the backup volume of the first volume.

(Supplementary Note 9)

A storage apparatus backup method by a storage apparatus including a volume including a storage area capable of storing data, the method including:

receiving an instruction related to backup of a first volume, from a backup source storage apparatus being another storage apparatus, the instruction at least including information by which a common data area can be identified, the common data area being an area storing data common to the first volume and a second volume, each of the volumes being included in the backup source storage apparatus and including a storage area capable of storing data;

in response to the received instruction, copying data included in the common data area identified by the instruction, from the volume storing data duplicated from the second volume to the volume storing data duplicated from the first volume;

receiving at least part of data included in an area different from the common data area in the first volume, from the backup source storage apparatus; and writing the received data onto the volume storing data duplicated from the first volume.

(Supplementary Note 10)

A storage apparatus backup system including:

a backup source storage apparatus being a storage apparatus including a first volume and a second volume, each of the volumes being a volume including a storage area capable of storing data; and a backup destination storage apparatus being another storage apparatus including a backup volume being a volume including a storage area capable of storing data, wherein the backup source storage apparatus further includes:
a backup controller that
identifies a common data area being an area storing data common to the first volume and the second volume, and
transmits an instruction to the backup destination storage apparatus, the instruction indicating copying, in the backup destination storage apparatus, data stored in the common data area, from the backup volume of the second volume to the backup volume of the first volume; and
a remote copy controller that transmits at least part of data stored in an area different from the common data area in the first volume to the backup destination storage apparatus, and
the backup destination storage apparatus further includes
a remote instruction processing unit that performs:
processing of
receiving the instruction from the backup source storage apparatus, and,
in response to the received instruction, copying data included in the common data area identified by the instruction, from the backup volume of the second volume in the backup destination storage apparatus itself to the backup volume of the first volume; and
processing of
receiving at least part of data included in an area different from the common data area in the first volume, from the backup source storage apparatus, and
writing the received data onto the backup volume of the first volume.

The previous description of embodiments is provided to enable a person skilled in the art to make and use technology regarding the present disclosure. Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A storage apparatus comprising:
processing circuitry and a memory storing instructions that when executed by the processing circuitry allows:
a backup controller to identify a common data area in each of a first volume and a second volume, each of the volumes including a storage area capable of storing data, the common data area in each of the first volume and the second volume being an area storing data common to the first volume and the second volume, and to transmit an instruction to a backup destination storage apparatus being another storage apparatus configured to include, for each of the first volume and the second volume, a backup volume storing backup data duplicated from each of the first volume and the second volume, the instruction causing the backup destination storage apparatus to copy, in the backup destination storage apparatus, data stored in the common data area in the backup volume of the second volume to the backup volume of the first volume; and
a remote copy controller to transmit data stored in an area different from the common data area in the first volume to the backup destination storage apparatus to duplicate the data to the backup volume of the first volume in the backup destination storage apparatus.

2. The storage apparatus according to claim 1, wherein the first volume is a clone volume derived from an entity volume being the volume used as a master, the clone volume being the volume storing a difference from the entity volume, the second volume is the clone volume different from the first volume and derived from the entity volume same as the first volume, and
the backup controller selects at least one second volume out of one or more second volumes for which backup processing to the backup destination storage apparatus is started, and identifies the common data area by specifying an area in the entity volume and an area in the first volume corresponding to each other and including no difference, and specifying an area in the entity volume and an area in the second volume corresponding to each other and including no difference.

3. The storage apparatus according to claim 2, wherein the backup controller selects the second volume for which backup processing is started first, out of the at least one of the selected second volume for which backup processing to the backup destination storage apparatus is started, and transmits the instruction which causes the backup destination storage apparatus to copy data stored in the common data area in the backup volume of the at least one of the selected second volume for which backup processing is started first to the backup volume of the first volume.

4. The storage apparatus according to claim 2, wherein the backup controller identifies the common data area between each of one or more of the second volumes for which backup processing to the backup destination storage apparatus is started and the first volume, selects the second volume having a largest common data area with the first volume, and transmits the instruction which causes the backup destination storage apparatus to copy data stored in the common data area in the backup volume of the second volume being selected to the backup volume of the first volume.

5. The storage apparatus according to claim 2, wherein the remote copy controller,
with regard to an area having a difference from the entity volume among areas different from the common data area in the first volume, transmits data stored in the area having the difference from the entity volume in the first volume to the backup destination storage apparatus, and,
with regard to an area having no difference from the entity volume among areas different from the common data area in the first volume, transmits data stored in the area in the entity volume to the backup destination storage apparatus.

6. The storage apparatus according to claim 1, wherein the backup controller selects a plurality of the second volumes for which backup processing to the backup destination storage apparatus is already started, and identifies the common data area between each of the plurality of the second volumes and the first volume, and the remote copy controller transmits at least part of data stored in an area different from each of the common data areas identified by the backup controller in the first volume to the backup destination storage apparatus.

7. A backup destination storage apparatus comprising:
one or more backup volumes being a volume including a storage area capable of storing data; and
processing circuitry and a memory storing instructions that when executed by the processing circuitry allows:
a remote instruction processing unit to execute processing of receiving an instruction for backup of a first volume, from a backup source storage apparatus being another storage apparatus, the instruction at least including information by which a common data area can be identified, the common data area being an area in each of the first volume and a second volume for storing data common to the first volume and the second volume, each of the first volume and the second volume being included in the backup source storage apparatus and including a storage area capable of storing data;
in response to the instruction, copying data included in the common data area identified by the instruction in a backup volume of the second volume to a backup volume of the first volume, in the backup destination storage apparatus itself, wherein the backup volume of the first volume storing backup data duplicated to the backup volume of the first volume;
receiving at least part of data included in an area different from the common data area in the first volume from the backup source storage apparatus; and
writing the received data onto the backup volume of the first volume.

8. A storage apparatus backup system comprising:
a backup source storage apparatus including a first volume and a second volume, each of the first volume and the second volume including a storage area capable of storing data; and
a backup destination storage apparatus including a backup volume being a volume including a storage area capable of storing data, the backup destination storage apparatus being different from the backup source storage apparatus, wherein the backup source storage apparatus further includes processing circuitry and a memory storing instructions that when executed by the processing circuitry allows:
a backup controller to identify a common data area in each of the first volume and the second volume, the common data area being an area storing data common to the first volume and the second volume, and to transmits an instruction to the backup destination storage apparatus, the instruction causes the backup destination storage apparatus to copy, in the backup destination storage apparatus, data stored in the common data area in a backup volume of the second volume to a backup volume of the first volume; and a remote copy controller to transmit at least part of data stored in an area different from the common data area in the first volume to the backup destination storage apparatus, and the backup destination storage apparatus further includes processing circuitry and a memory storing instructions that when executed by the processor allows:

a remote instruction processing unit to execute processing of receiving the instruction from the backup source storage apparatus, and in response to the received instruction, copying data included in the common data area identified by the received instruction, from the backup volume of the second volume to the backup volume of the first volume, in the backup destination storage apparatus itself, receiving at least part of data included in an area different from the common data area in the first volume, from the backup source storage apparatus, and writing the received data onto the backup volume of the first volume.

* * * * *